US012636599B2

(12) United States Patent
Verbelen et al.

(10) Patent No.: US 12,636,599 B2
(45) Date of Patent: May 26, 2026

(54) FILTER ELEMENT, FILTER HEAD, AND FILTER SYSTEM

(71) Applicant: Donaldson Company, Inc., Bloomington, MN (US)

(72) Inventors: Erwin Verbelen, Meise (BE); Luca Ghisu, Bierbeek (BE); Robert A. McGlade, Somerset, WI (US); John K. Aune, Edina, MN (US); Jared J. Flanigan, St. Louis Park, MN (US)

(73) Assignee: Donaldson Company, Inc., Bloomington, MN (US)

( * ) Notice: Subject to any disclaimer, the term of this patent is extended or adjusted under 35 U.S.C. 154(b) by 531 days.

(21) Appl. No.: 18/007,384

(22) PCT Filed: Jul. 20, 2021

(86) PCT No.: PCT/US2021/042334
§ 371 (c)(1),
(2) Date: Jan. 30, 2023

(87) PCT Pub. No.: WO2022/026244
PCT Pub. Date: Feb. 3, 2022

(65) Prior Publication Data
US 2023/0271120 A1 Aug. 31, 2023

Related U.S. Application Data

(60) Provisional application No. 63/058,086, filed on Jul. 29, 2020.

(51) Int. Cl.
B01D 35/153 (2006.01)
*B01D 35/147* (2006.01)

(52) U.S. Cl.
CPC .......... B01D 35/153 (2013.01); *B01D 35/147* (2013.01); *B01D 2201/291* (2013.01)

(58) Field of Classification Search
CPC ............... B01D 35/153; B01D 35/147; B01D 2201/291; B01D 35/16
(Continued)

(56) References Cited

U.S. PATENT DOCUMENTS 5,182,015 A 1/1993 Lee
6,146,527 A 11/2000 Oelschlaegel
(Continued)

FOREIGN PATENT DOCUMENTS

DE 102015208426 A1 11/2016
DE 102016124587 A1 * 6/2018 ........... B01D 35/306
(Continued)

OTHER PUBLICATIONS

English Machine Translation of DE102016124587A1.*
International Search Report and Written Opinion for PCT/US2021/042334 (Sep. 24, 2021).

*Primary Examiner* — Madeline Gonzalez
(74) *Attorney, Agent, or Firm* — Merchant & Gould P.C.

(57) ABSTRACT

A filter element for releasable connection with a filter head a first end cap defining a first open aperture; a tubular construction of filter media being secured to the first end cap; and an axially extending neck, surrounding the first open aperture, having, an outer radial surface and an inner radial surface. The filter element includes a first linear to rotary motion conversion element, arranged to engage with a second linear to rotary motion conversion element on a valve element of the filter head so as to impart, when the filter element is moved linearly towards the valve element in a direction along a longitudinal axis, a rotational movement onto the valve element.

12 Claims, 19 Drawing Sheets

(58) Field of Classification Search
USPC .... 210/234, 235, 450, 493.2, 442, 444, 136, 210/117
See application file for complete search history.

(56) References Cited

U.S. PATENT DOCUMENTS

| | | | |
|---|---|---|---|
| 6,458,269 | B1 | 10/2002 | Bassett et al. |
| 6,723,239 | B2 | 4/2004 | Maxwell |
| 7,070,692 | B2 | 7/2006 | Knight |
| 8,097,154 | B2 | 1/2012 | Dworatzek et al. |
| 9,044,698 | B2 | 6/2015 | Ardes |
| 10,071,326 | B2 | 9/2018 | Schmoll |
| 2005/0072721 | A1 | 4/2005 | Knight |
| 2006/0054547 | A1 | 3/2006 | Richmond et al. |
| 2006/0186031 | A1 | 8/2006 | Fick et al. |
| 2008/0264850 | A1 | 10/2008 | Amesoder et al. |
| 2009/0090668 | A1 | 4/2009 | Abdalla et al. |
| 2012/0223003 | A1 | 9/2012 | Richmond et al. |
| 2013/0248464 | A1 | 9/2013 | Schweitzer |
| 2013/0313179 | A1 | 11/2013 | Kocksch |
| 2013/0313183 | A1 | 11/2013 | Allott et al. |
| 2014/0202944 | A1 | 7/2014 | Wes |
| 2019/0046904 | A1 | 2/2019 | Norén et al. |

FOREIGN PATENT DOCUMENTS

| | | | |
|---|---|---|---|
| WO | 98/05408 | A1 | 2/1998 |
| WO | 2008/118939 | A1 | 10/2008 |
| WO | 2011/056857 | A1 | 5/2011 |
| WO | 2017/151481 | A1 | 9/2017 |
| WO | 2018/134627 | A2 | 7/2018 |

* cited by examiner

FILTER ELEMENT, FILTER HEAD, AND FILTER SYSTEM

This application is a National Stage Application of PCT International Patent application No. PCT/US2021/042334, filed Jul. 20, 2021, which claims priority to U.S. Provisional patent application Ser. No. 63/058,086, filed Jul. 29, 2020, entitled FILTER ELEMENT, FILTER HEAD, AND FILTER SYSTEM, and which applications are incorporated herein by reference. To the extent appropriate, a claim of priority is made to each of the above disclosed applications.

TECHNICAL FIELD

This disclosure pertains to the field of filtration, and in particular to a filter element, a filter head, and a filter system comprising such filter element and filter head.

BACKGROUND

International patent application publication no. WO 2011/056857 A1 in the name of the present applicant discloses a filter cartridge including a key ring with at least first and second protrusions to engage a lock-out assembly in a filter head, permitting the cartridge to connect to the filter head. A filter system includes a filter assembly, including a filter cartridge and a cartridge housing, connected to a filter head, in which the filter head includes an adapter assembly with a lock-out mechanism. The lock-out mechanism is unlocked by a key ring on the filter cartridge. A method of installing a filter assembly includes using protrusions on a key ring on a filter cartridge to unlock an adapter assembly in a filter head to allow for connection between the filter assembly and the filter head.

US patent application publication no. US 2012/223003 A1 in the name of Baldwin Filters Inc. discloses a filter cartridge having a keyed end cap which is configured and shaped for unlocking an associated valve mechanism that comprises a latch device and a valve. In this manner, when the fuel filter cartridge is placed into a fuel filter housing having such a latch and valve mechanism, the fuel filter cartridge is operable therein to filter fluid and pass the fluid into a standpipe contained within the fuel filter housing. The fuel filter cartridge of this type generally includes pleated filter paper which is disposed between two opposed end caps. The keys may be provided along the bottom end cap.

United States patent application publication no. US 2009/0090668 A1 in the name of Cummins Filtration IP, Inc. discloses a "no filter, no run" filtration system that is designed to very that an appropriate filter cartridge is installed. A flow control valve is provided on a standpipe to control the flow of fuel into the standpipe. The valve has a component that has a first position at which any flow through the flow passage past the valve is insufficient to permit engine operation, and a second position at which a greater amount of flow through the flow passage is permitted by the valve in an amount sufficient to permit engine operation, and the component rotates about the longitudinal axis when it moves from the first position to the second position and from the second position to the first position. It is a disadvantage of that system that it can only be applied to filter housings using a standpipe.

German patent application publication no. DE102015208426A1 in the name of MAHLE International GmbH discloses a filter device with a filter housing including a filter housing pot and a filter housing cover, and with a ring filter element connected to the filter housing cover via a bayonet lock. A first dome is provided on the filter housing cover with first bayonet wings arranged on the outside. A second dome is provided on an upper end plate of the ring filter element with second bayonet wings arranged on the inside, the second dome coaxially surrounding the first dome when the ring filter element is mounted on the filter housing cover. Between the end plate of the ring filter element and the filter hosing cover, an annual seal is arranged. The bayonet lock has a locking end position, in which the seal is compressed, acts as a spring element, and fixes the bayonet lock in its locking end position. This publication is not concerned with a "no filter, no run" function.

There is a need for an alternative and improved "no filter, no run" function for liquid filtration systems.

SUMMARY

The present disclosure discloses a filter element according to claim 1 and an associated filter head and an associated filtration assembly.

In a first aspect of the disclosure, a filter element for releasable connection with a filter head is provided. The filter element having an elongate shape with a longitudinal axis; the filter element comprising:

(a) a first end cap defining a first open aperture;

(b) a tubular construction of filter media defining an open filter interior and having first and second opposite ends, the first end being secured to the first end cap whereby the first open aperture is in communication with the open filter interior; and (c) an axially extending neck, surrounding said first open aperture, having an outer radial surface and an inner radial surface;

wherein the filter element comprises a first linear to rotary motion conversion element, arranged to engage with a second linear to rotary motion conversion element on a valve element of the filter head so as to impart, when the filter element is moved linearly towards the valve element in a direction along the longitudinal axis, a rotational movement onto the valve element.

Preferably, the filter element is substantially cylindrical in nature with the longitudinal axis as cylindrical symmetry axis. Preferably, the first end cap lays in a plane perpendicular to the longitudinal axis. Preferably, the tubular construction of filter media is cylindrical in nature with the longitudinal axis as cylindrical symmetry axis. The filter media may comprise pleated media or foamed media or other media known to the skilled person. Preferably, the axially extending neck is cylindrical in nature with the longitudinal axis as cylindrical symmetry axis. The axially extending neck can extend in axial direction away from the open filter interior or towards the open filter interior. Preferably, the first open aperture does not overlap with the filter media in axial projection.

Preferably, the filter element comprises a second end cap at a second end. The second end cap is preferably secured to the second end of the filter media. Preferably, the second end cap lays in a plane perpendicular to the longitudinal axis.

In some embodiments, the first linear to rotary motion conversion element is in a fixed position relative to the filter element.

In some embodiments, the axially extending neck comprises the first linear to rotary motion conversion element.

In some embodiments, the first end cap comprises the first linear to rotary motion conversion element.

In some embodiments, the filter element comprises an inner liner, the inner liner comprising the first linear to rotary motion conversion element.

According to preferred embodiments, said first end cap comprises the axially extending neck. For instance, the axially extending neck can protrude from a main outer surface of said first end cap.

In some embodiments, the axially extending neck comprises the first linear to rotary motion conversion element and the first linear to rotary motion conversion element is adjacent to the inner radial surface of the axially extending neck. Preferably, the first linear to rotary motion conversion element extends radially inwards from the inner radial surface of the axially extending neck. Preferably, the outer radial perimeter of the first linear to rotary motion conversion element is connected to the inner radial surface of the axially extending neck.

In some embodiments, the axially extending neck comprises the first linear to rotary motion conversion element and the first linear to rotary motion conversion element is adjacent to the outer radial surface of the axially extending neck. Preferably, the first linear to rotary motion conversion element extends radially outwards from the outer radial surface of the axially extending neck. Preferably, the inner radial perimeter of the first linear to rotary motion conversion element is connected to the outer radial surface of the axially extending neck.

In some embodiments, the first linear to rotary motion conversion element comprises an upward facing guiding surface following an axially progressing path.

Preferably, the upward facing guiding surface is delimited by a circular inner and outer perimeter, with the longitudinal axis as center, in axial projection. Preferably, the upward facing guiding surface covers an angular extent of at least 90° around the longitudinal axis.

The upward facing guiding surface may comprise one or more surface guiding parts, wherein each of the one or more surface guiding parts comprises a continuous upward facing surface, but the upward facing surfaces might be discontinuous between the one or more surface guiding parts. Preferably, each of the one or more surface guiding parts covers an angular extent of at least 90° around the longitudinal axis. The axially progressing path of each of the one or more surface guiding parts can be of the left-handed orientation or of the right-handed orientation. The axially progressing path has the same orientation for all of the one or more surface guiding parts. In the presence of two or more surface guiding parts, the two or more surface guiding parts are preferably distributed around the longitudinal axis so as to display rotational symmetry around the longitudinal axis.

Preferably, the engagement of the upward facing guiding surface with the second linear to rotary motion conversion element on the valve element of the filter head happens through abutment in axial direction when the filter element is moved towards the valve element in a direction along the longitudinal axis.

The pitch angle of the upward facing guiding surface is defined as the smallest angle between a plane perpendicular to the longitudinal axis and the upward facing guiding surface.

Preferably, the pitch angle of the upward facing guiding surface is sufficiently large such that the engagement through abutment of the upward facing guiding surface with the second linear to rotary motion conversion element of the valve element of the filter head does not block the axial movement of the filter element towards the valve element when the filter element cannot rotate with respect to the filter head. Preferably, the pitch angle of the upward facing guiding surface is sufficiently large such that the engagement through abutment of the upward facing guiding surface with the second linear to rotary motion conversion element on the valve element of the filter head imparts a rotational movement onto the valve element, with respect to the filter head and the filter element, when the filter element moves in axial direction towards the valve element without the filter element rotating with respect to the filter head.

In preferred embodiments, the pitch angle is greater than 20°, 30°, 40°. In preferred embodiments, the pitch angle is smaller than 80°, 70°, 60°. The pitch angle may vary in axial direction. In preferred embodiments with varying pitch angle, the minimum pitch angle is greater than 20°, 30°, 40°. In preferred embodiments with varying pitch angle, the maximum pitch angle is smaller than 80°, 70°, 60°. The pitch angle is identical for all of the on one or more surface guiding parts. The pitch angle can be constant for each of the one or more surface guiding parts. The pitch angle can vary in a continuous way along the axially progressing path for each of the one or more surface guiding parts.

Preferably, the upward facing guiding surface is manufactured from the same material as the part comprising the upward facing guiding surface. Preferably, the upward facing guiding surface is manufactured during the same manufacturing process as the part comprising the upward facing guiding surface.

In some embodiments, the first linear to motion conversion element comprises one or more protrusions.

In some embodiments, the axially extending neck comprises the first linear to rotary motion conversion element, the first linear to rotary motion conversion element is adjacent to the inner radial surface of the axially extending neck, the first linear to rotary motion conversion element comprises an upward facing guiding surface and the upward facing guiding surface is formed by a slanted or helicoidal rib provided on the inner radial surface of the axially extending neck. In the presence of two or more surface guiding parts, each of the two or more surface guiding parts comprises such a slanted or helicoidal rib provided on the inner radial surface of the axially extending neck.

In some embodiments, the axially extending neck comprises the first linear to rotary motion conversion element, the first linear to rotary motion conversion element is adjacent to the inner radial surface of the axially extending neck, the first linear to rotary motion conversion element comprises an upward facing guiding surface and the upward facing guiding surface is formed by a discontinuity of the inner diameter of the axially extending neck. In the presence of two or more surface guiding parts, each of the two or more surface guiding parts comprises such a discontinuity of the inner diameter of the axially extending neck.

In some embodiments, the axially extending neck comprises the first linear to rotary motion conversion element, the first linear to rotary motion conversion element is adjacent to the outer radial surface of the axially extending neck, the first linear to rotary motion conversion element comprises an upward facing guiding surface and the upward facing guiding surface is formed by a slanted or helicoidal rib provided on the outer radial surface of the axially extending neck. In the presence of two or more surface guiding parts, each of the two or more surface guiding parts comprises such a slanted or helicoidal rib provided on the outer radial surface of the axially extending neck.

In some embodiments, the axially extending neck comprises the first linear to rotary motion conversion element, the first linear to rotary motion conversion element is adjacent to the inner radial surface of the axially extending neck, the first linear to rotary motion conversion element comprises an upward facing guiding surface and the upward facing guiding surface is formed by a discontinuity of the outer diameter of the axially extending neck. In the presence of two or more surface guiding parts, each of the two or more surface guiding parts comprises such a discontinuity of the outer diameter of the axially extending neck.

In some embodiments, the axially extending neck comprises the first linear to rotary motion conversion element, the first linear to rotary motion conversion element is adjacent to the inner radial surface of the axially extending neck, the first linear to rotary motion conversion element comprises an upward facing guiding surface and the upward facing guiding surface is formed by one or more cylinder mantle sectors protruding from the first end cap and arranged coaxially with the axially extending neck. In these embodiments, the axially extending neck and the one or more cylinder mantle sectors preferably extend in axial direction away from the open filter interior.

In some of these embodiments, the one or more cylinder mantle sectors protruding from the first end cap comprise a full cylinder mantle segment with a slanted top.

In some embodiments, the first end cap of the filter element comprises one or more axially protruding and radially extending stop, arranged to rest against one or more corresponding stops of a filter head to inhibit rotation of the filter element relative to the filter head. Preferably, the one or more stops on the first end cap extend axially away from the filter media. Preferably, the one or more stops on the filter element have a height greater than 10, 20, 30 mm. Preferably, the one or more stops on the filter element have a width in radial direction greater than 10, 20 mm. Preferably, the one or more stops on the first end cap are manufactured from the same material as the first end cap. Preferably, the one or more stops on the first end cap are manufactured during the same manufacturing process as the first end cap.

The one or more corresponding stops on the filter head are arranged to inhibit rotation of the filter element relative to the filter head through abutment of the one or more first end cap stops with the one or more filter head stops. The one or more stops on the filter head are arranged to allow axial movement of the filter element relative to the filter head.

The one or more stops on the filter head are arranged to inhibit rotation of the filter element relative to the filter head when the filter element is within a predetermined axial distance of the filter head.

Preferably, when the first end cap of the filter element abuts against the filter head, more than 60%, 70%, 80%, 90% of the height of the one or more stops on the first end cap is in contact with the one or more corresponding stops on the filter head.

In preferred embodiments, the one or more stops on the first end cap comprise two or more end cap stopping surfaces and the one or more stops on the filter head comprise two or more corresponding filter head stopping surfaces. Preferably, the two or more surface end cap stopping surfaces and the two or more filter head stopping surfaces are distributed around the longitudinal axis so as to display rotational symmetry around the longitudinal axis.

In preferred embodiments, the one or more stops on the first end cap and the one or more corresponding stops on the filter head are configured to inhibit rotation of the filter element relative to the filter head in both clockwise and counter-clockwise direction around the longitudinal axis.

In preferred embodiments, the radial distance between the innermost radial edge of the one or more stops on the first end cap and the outer radial surface of the axially extending neck is equal to or larger than 5, 6, 7, 8, 9 or 10 mm.

In some embodiments, the outer radial surface of the axially extending neck comprises an O-ring seal.

In some of these embodiments, the axial height of the one or more stops with respect to the main outer surface of the first end cap is superior to the axial distance between the O-ring seal and the main outer surface of the first end cap. It is an advantage of these embodiments that the relative rotation between the filter element and the filter head is inhibited by the one or more stops before the O-ring seal is engaged by the filter head and that therefore, the relative angular position between the filter element and the filter head is determined by the orientation of the one or more stops.

In a second aspect of the disclosure, a filter head for use with the filter element is provided. The filter head comprising a valve having at least two valve elements arranged in a configuration that allows relative rotation, the valve being arranged to transition, through the relative rotation of the at least two valve elements, between an open position and a closed position;

wherein a first one of the at least two valve elements comprises a second linear to rotary motion conversion element arranged to engage with the first linear to rotary motion conversion element of the filter element; and wherein the valve is biased in the closed position and configured to transition to the open position, through engagement of the second linear to rotary motion conversion element with the first linear to rotary motion conversion element, when the filter element is moved towards the filter head.

In certain embodiments, a second one of the at least two valve elements can be integrated in the head. In such cases, the second one of the at least two valve element can have a fixed position relative to the head, while a first one of the at least two valve elements can rotate relative to the second one.

Preferably, the axis of relative rotation of the at least two valve elements coincides with the longitudinal axis of the filter element when the filter element is moved towards the filter head. In the open position of the valve, fluid may flow through the valve. In the closed position of the valve, fluid may not flow through the valve. The skilled person is aware of means to bias a rotational valve. A torsion spring for instance can be used to bias such a valve. When the filter element is moved away from the filter head, the bias means closes the valve. Preferably, the valve is fully open when the filter element abuts against the filter head. Preferably, the valve is fully closed when the filter head does not restrict the rotational movement of the filter element with respect to the filter head.

In preferred embodiments, the valve is biased in its closed position and configured to transition to its open position through rotation of the first one of the at least two valve elements in a clockwise direction, when viewed from above, around the longitudinal axis with respect to the filter head.

t is an advantage of these embodiments that, when using conventional screw thread orientation on the filter bowl and filter head, the valve transitions from its closed to its open position through a relative rotation with respect to the filter head that is opposite in direction to the relative rotation of the filter bowl with respect to the filter head when the bowl is screwed onto the head. This ensures that the valve cannot be opened by means of eventual friction forces between the first one of the at least two valve elements and an incompatible filter element if one inserts the incompatible filter element in the filter bowl and screws the bowl onto the filter head.

In preferred embodiments, the valve is biased in its closed position and configured to transition to its open position through rotation of the first one of the at least two valve elements in a counter-clockwise direction, when viewed from above, around the longitudinal axis with respect to the filter head.

In some embodiments, the at least two valve elements comprise at least two consecutive coaxial discs. Preferably, the discs are coaxially aligned along an axis that coincides with the longitudinal axis of the filter element when the filter element is pushed onto the filter head. The discs comprise one or more openings. Preferably, the respective one or more openings in the discs are equal in number, size and distribution over the respective discs. Preferably, all of the openings in all of the discs fall in axial projection within the first open aperture of the first end cap of the filter element when the filter element is moved towards the filter head.

In the open position of the valve, the respective openings in the consecutive coaxial discs are aligned such that fluid may flow through the openings. In the closed position of the valve, the respective openings in the consecutive coaxial discs are not aligned such that fluid may not flow through the openings. Preferably, the axial distance between the consecutive discs is sufficiently small such that fluid may not flow through the openings when these are not aligned. Alternatively, the consecutive discs may be equipped with suitable sealing means between them such that fluid may not flow through the openings when these are not aligned. The skilled person will understand that the discs are preferably out of a suitable material, like stainless steel, brass, bronze or a suitable plastic.

At least a first one of the consecutive coaxial discs is mounted on a valve axle and comprises a second linear to rotary motion conversion element. The at least a first one of the consecutive coaxial discs is configured to rotate relative to at least a second of the consecutive discs through engagement of the second linear to rotary motion conversion element with the first linear to rotary motion conversion element of the filter element when the filter element is moved towards the filter head. Preferably, the valve axle, which is the rotation axis of the at least a first one of the consecutive coaxial discs, coincides with the longitudinal axis of the filter element when the filter element is moved towards the filter head.

The relative rotation of at least a first of the consecutive discs with respect to at least a second of the consecutive discs causes the valve to transition between its open and its closed position. Preferably, the relative rotation required to go from a fully closed to a fully open position of the valve is superior to 60°. Preferably, the relative rotation required to go from a fully closed to a fully open position of the valve is inferior to 120°.

Preferably, the relative rotation required to go from a fully closed to a fully open position of the valve is equal to 90°.

In some embodiments, the at least two valve elements comprise at least two consecutive coaxial cylindrical elements. Preferably, the cylindrical elements are coaxial along an axis that coincides with the longitudinal axis of the filter element when the filter element is pushed onto the filter head. The cylindrical elements comprise one or more openings in their radial surfaces. Preferably, the respective one or more openings in the cylindrical elements are equal in number, size and distribution over the respective radial surfaces of the cylindrical elements.

In the open position of the valve, the respective openings in the coaxial cylindrical elements are aligned such that fluid may flow through the openings. In the closed position of the valve, the respective openings in the coaxial cylindrical elements are not aligned such that fluid may not flow through the openings. Preferably, the radial gap between the coaxial cylindrical elements is sufficiently small such that fluid may not flow through the openings when these are not aligned. Alternatively, the coaxial cylindrical elements may be equipped with suitable sealing means between them such that fluid may not flow through the openings when these are not aligned. The skilled person will understand that the cylindrical elements are preferably out of a suitable material, like stainless steel, brass, bronze or a suitable plastic.

At least a first one of the coaxial cylindrical elements is mounted on a valve axle and comprises a second linear to rotary motion conversion element. The at least a first one of the coaxial cylindrical elements is configured to rotate relative to at least a second of the coaxial cylindrical elements through engagement of the second linear to rotary motion conversion element with the first linear to rotary motion conversion element of the filter element when the filter element is moved towards the filter head. Preferably, the valve axle, which is the rotation axis of the at least a first one of the coaxial cylindrical elements, coincides with the longitudinal axis of the filter element when the filter element is moved towards the filter head.

The relative rotation of at least a first of the coaxial cylindrical elements with respect to at least a second of the coaxial cylindrical elements causes the valve to transition between its open and its closed position. Preferably, the relative rotation required to go from a fully closed to a fully open position of the valve is superior to 60°. Preferably, the relative rotation required to go from a fully closed to a fully open position of the valve is inferior to 120°. Preferably, the relative rotation required to go from a fully closed to a fully open position of the valve equals 90°.

In some embodiments, the second linear to rotary motion conversion element comprises a downward facing guiding surface following an axially progression path.

Preferably, the downward facing guiding surface is delimited by a circular inner and outer perimeter. Preferably, the axial projection of the longitudinal axis of the filter element is the center of the circular inner and outer perimeter of the downward facing guiding surface, when the filter element is moved towards the filter head. Preferably, the downward facing guiding surface covers an angular extent of at least 90° around the longitudinal axis.

The downward facing guiding surface may comprise one or more surface guiding parts, wherein each of the one or more surface guiding parts comprises a continuous downward facing surface, but the downward facing surfaces might be discontinuous between the one or more surface guiding parts. Preferably, each of the one or more surface guiding parts covers an angular extent of at least 90° around the longitudinal axis. The axially progressing path of each of the one or more surface guiding parts can be of the left-handed orientation or of the right-handed orientation. The axially progressing path has the same orientation for all of the one or more surface guiding parts. In the presence of two or more surface guiding parts, the two or more surface guiding parts are preferably distributed around the longitudinal axis so as to display rotational symmetry around the longitudinal axis.

Preferably, the engagement of the downward facing guiding surface with the first linear to rotary motion conversion element on the filter element happens through abutment in axial direction when the filter element is moved towards the valve element in a direction along the longitudinal axis.

The pitch angle of the downward facing guiding surface is defined as the smallest angle between a plane perpendicular to the longitudinal axis and the downward facing guiding surface.

Preferably, the pitch angle of the downward facing guiding surface is sufficiently large such that the engagement through abutment of the downward facing guiding surface with the first linear to rotary motion conversion element of the filter element does not block the axial movement of the filter element towards the valve element when the filter element cannot rotate with respect to the filter head. Preferably, the pitch angle of the downward facing guiding surface is sufficiently large such that the engagement through abutment of the downward facing guiding surface with the first linear to rotary motion conversion element on the filter element imparts a rotational movement onto the valve element, with respect to the filter head and the filter element, when the filter element moves in axial direction towards the valve element without the filter element rotating with respect to the filter head.

In preferred embodiments, the pitch angle is greater than 20°, 30°, 40°. In preferred embodiments, the pitch angle is smaller than 80°, 70°, 60°. The pitch angle may vary in axial direction. In preferred embodiments with varying pitch angle, the minimum pitch angle is greater than 20°, 30°, 40°. In preferred embodiments with varying pitch angle, the maximum pitch angle is smaller than 80°, 70°, 60°. The pitch angle is identical for all of the on one or more surface guiding parts. The pitch angle can be constant for each of the one or more surface guiding parts. The pitch angle can vary in a continuous way along the axially progressing path for each of the one or more surface guiding parts.

Preferably, the downward facing guiding surface is manufactured from the same material as the valve element comprising the downward facing guiding surface. Preferably, the downward facing guiding surface is manufactured during the same manufacturing process as the valve element comprising the downward facing guiding surface.

In some embodiments, the second linear to rotary motion conversion element comprises one or more protrusions. In preferred embodiments, the second linear to rotary motion conversion element comprises two or more protrusions, arranged to engage with the first linear to rotary motion conversion element of the filter element, on its outer radial surface. Preferably, the two or more protrusions are arranged over the outer radial surface to display rotational symmetry with respect to the axis of relative rotation of the at least two valve elements. Preferably, the protrusions extend in radial direction over a distance greater than 3, 5, 10 mm. Preferably, the protrusions extend in radial direction over a distance smaller than 15, 20, 25 mm. Preferably, the protrusions are of cylindrical shape.

As disclosed in the previous paragraphs, in preferred embodiments the filter head comprises one or more stops arranged to inhibit rotation of the filter element relative to the filter head, such that upon engagement of the respective stops of the filter head and the filter element, the filter element can continue to approach the filter head in a non-rotating axial movement suited to act upon the valve.

Preferably, the one or more stops on the filter head and the one or more stops on the filter element are arranged, such that upon engagement of the respective stops of the filter head and the filter element, the filter head and the filter element are fixed in a relative angular position, with respect to each other, that allows the first linear to rotary motion conversion element to act upon the second linear to rotary motion conversion element.

In a third aspect of the disclosure, a filtration system comprising a filter element according the disclosure, arranged in a filter head according to the disclosure, is provided.

The present disclosure primarily concerns filtration systems of the bottom-mount type. Such systems are well known to the skilled person and generally comprise a filter element, a filter head and a filter bowl. The filter bowl is a longitudinal enclosure, arranged for receiving the filter element. Preferably, more than 70%, 80%, 90% of the length of the filter element is received by the filter bowl. Once the filter element is received by the filter bowl, the filter bowl can be screwed onto the filter head to complete the filtration system.

The filter head comprises the inflow and outflow openings for the fluid to be filtered. Upon assembly of the filtration system, one of these openings is fluidly coupled with the internal volume of the filter bowl outside the filter element. The other opening is fluidly coupled with the open filter interior of the filter element. Appropriate sealing measures make sure that the fluid to be filtered can only pass from outside the filter element to the open filter interior, and hence from the filter head's inflow opening to the filter head's outflow opening—or vice versa—by passing through the filter media.

In embodiments according to the present disclosure, the filter element is received by the filter bowl such that axial or radial movement between filter element and filter bowl is restricted while relative rotational movement between filter element and filter bowl is allowed. A receiving arrangement that meets these criteria can be for instance a snap fit.

Once the filter element is properly received by the filter bowl, the filter bowl can be screwed onto the filter head. During the initial stage of this screwing process, the filter bowl rotates relative to the filter head and the filter element can rotate relative to the filter head and the filter bowl. Once the one or more stops on the first end cap abut against the one or more stops on the filter head, the relative movement of the filter element with respect to the filter head is restricted as disclosed in the previous paragraphs. Upon further screwing of the filter bowl onto the filter head, the filter element only moves axially with respect to the filter head and rotationally with respect to the filter bowl.

During the purely axial movement of the filter element towards the filter head, the second linear to rotary motion conversion element on at least one of the valve elements of the filter head engage with the first linear to rotary motion conversion element of the filter element such that the valve transitions from its closed to its opened position, as described in the previous paragraphs. When the filter bowl and the filter element reach their final position in the filter head, the valve is fully opened.

In preferred embodiments, the axially extending neck of the filter element comprises an O-ring seal. Preferably, the O-ring seal is situated on the outer radial surface of the axially extending neck of the filter element, the first linear to rotary motion conversion element is situated on the inner radial surface of the axially extending neck of the filter element and the diameter of at least one of the non-rotating valve elements is greater than the diameter of the axially extending neck of the filter element. The diameter and axial extent of the at least one of the non-rotating valve elements are chosen such that this valve element engages the O-ring seal while the filter element moves axially with respect to the filter head. In this way, a seal between the respective volumes comprising the filtered and unfiltered fluid is achieved.

In preferred embodiments, the one or more stops on the first end cap of the filter element, the O-ring seal on the axially extending neck of the filter element, the one or more stops on the filter head and the at least two valve elements of the filter head are arranged such that the one or more stops on the first end cap of the filter element engage with the one or more stops on the filter head before at least one of the at least two valve elements engages with the O-ring seal when the filter element is moved linearly towards the filter head. In this way, the relative angular position between the filter element and the filter head is fixed by the stops on the filter element and the filter head and not by the friction between the O-ring seal and at least one of the at least two valve elements.

It is an advantage of filtration assemblies according to the present disclosure that they are of the "no filter—no run" type. Indeed, in the absence of a filter element, the valve will not open and a fluid flow cannot be established between the inflow and outflow openings of the filtration assembly.

It is an additional advantage of filtration assemblies according to the present disclosure that they can be made not to function with the incorrect filter type. Indeed, upon installation of a filter whose first linear to rotary motion conversion element is not compatible with the second linear to rotary motion conversion element on the valve element, the valve will not open and a fluid flow cannot be established between the inflow and outflow openings of the filtration assembly.

BRIEF DESCRIPTION OF THE DRAWINGS

The disclosure will be further elucidated by means of the following description and the appended figures.

DETAILED DESCRIPTION

Figure 1:
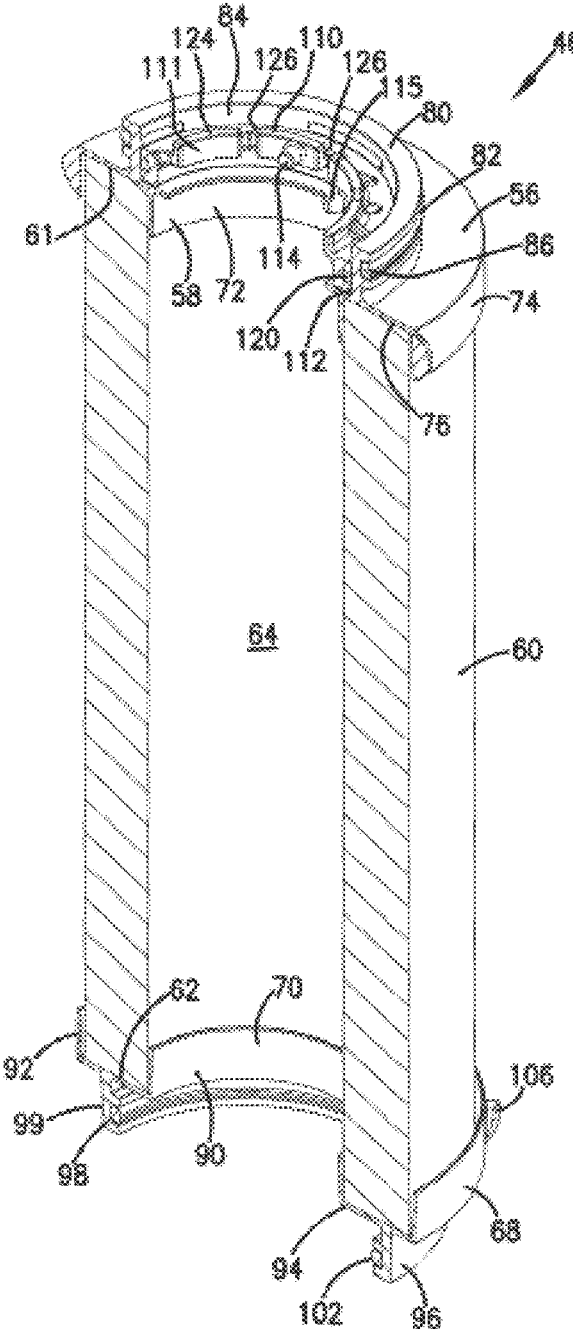
FIG. 1 displays a filter element from the prior art.

FIG. 1 displays a perspective cross-section of a filter element as disclosed in the prior art document WO 2011/056857 A1.

Figure 2:
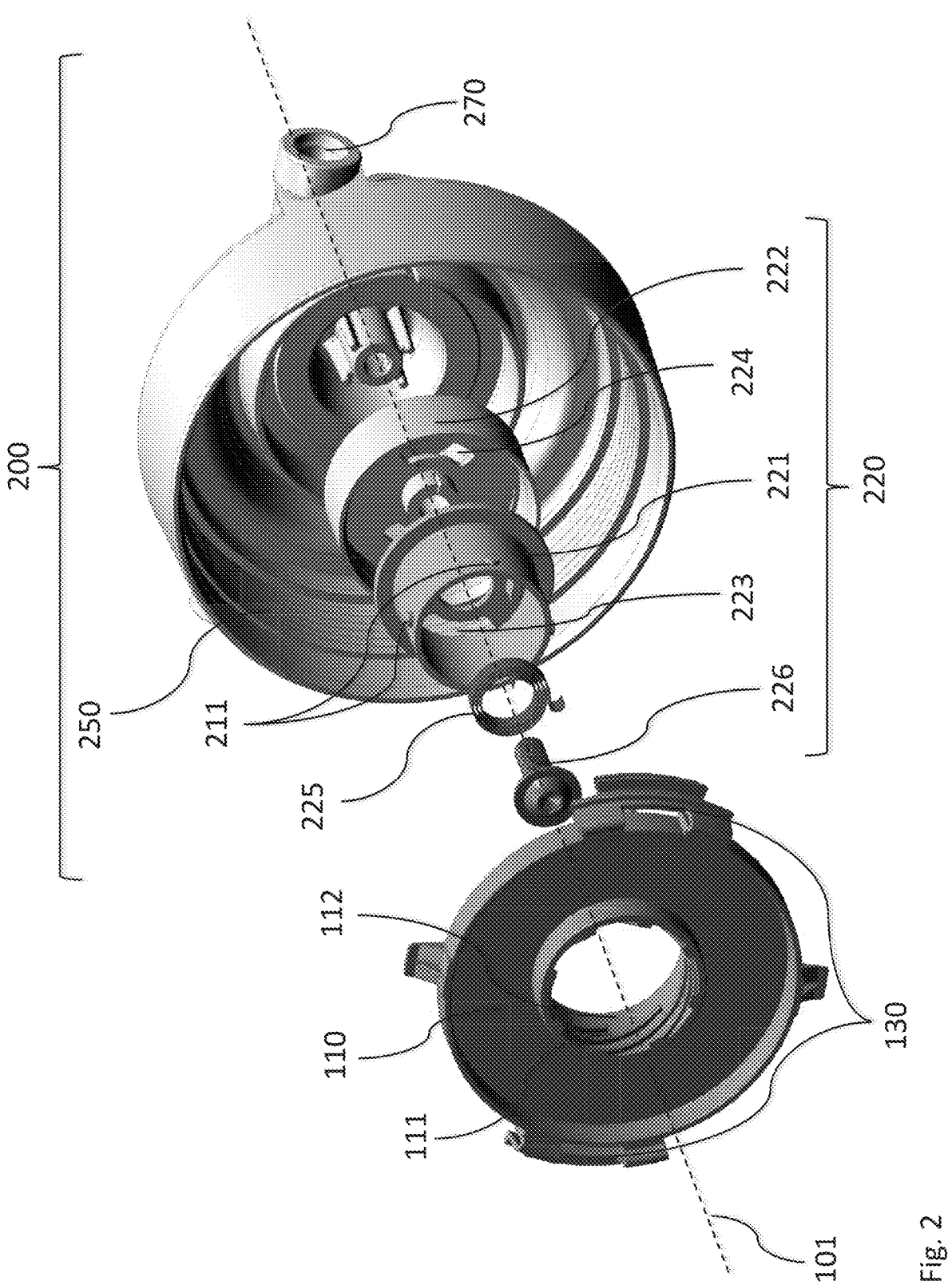
FIG. 2 displays an exploded view of an embodiment of a filter head, filter head valve and filter element first end cap according to the present disclosure.

FIG. 2 displays an exploded view of an embodiment of a filter head, filter head valve and filter element first end cap according to the present disclosure.

The filter head 200 has a circular perimeter comprising a thread 230 on the inner radial surface. The filter head 200 comprises a valve 210. The valve 210 comprises two coaxial disc-shaped valve elements 221 and 222. The skilled person is aware of suitable materials for the construction of these valve elements, such as for instance stainless steel, brass, bronze or a suitable plastic. The valve elements 221 and 222 are mounted on the valve axle 226, which defines the axis of relative rotation of the valve elements with respect to each other and to the filter head, lays perpendicular to the plane comprising the circular perimeter of the filter head and passes through the center of this plane.

The valve element 222 is arranged in a fixed relationship with the filter head 200. The valve element 221 is arranged such that it can rotate around the valve axle 226 with respect to the valve element 222 and the filter head 200. Both valve elements 221 and 222 comprise respective axial openings 223 and 224. When no external force acts upon the valve, the torsion spring 225 biases the rotatable valve element 221 such that the axial openings 223 and 224 do not overlap in axial projection. The skilled person will understand that other bias means can be used as well. Preferably, the axial gap between the valve elements 221 and 222 is sufficiently small such that no fluid can flow through the openings 223 and 224 when these openings do not overlap in axial projection.

The rotatable valve element 221, which is capable of rotating with respect to the stationary valve element 222 and the filter head 200, comprises a second linear to rotary motion conversion element 211 on its outer radial surface, arranged to display rotational symmetry with respect to the valve axle 226. In the embodiment of FIG. 2, the second linear to rotary motion conversion element 211 comprises radial protrusions—also called bosses. The protrusions are cylindrical in shape. Preferably, the protrusions are composed of the same material as the valve element 221 and manufactured together with the valve element 221 during the same manufacturing process. This manufacturing process can be any suitable process such as for instance injection molding.

The first end cap 110 of the filter element 100 (not depicted in FIG. 2) has a circular perimeter. The first end cap 110 comprises an aperture, surrounded by the axially extending neck 112. In the embodiment of FIG. 2, the first end cap 110 comprises the axially extending neck 112. The aperture is coaxial with the longitudinal axis 101 of the filter element 100. The inner radial surface of the axially extending neck 112 comprises a first linear to rotary motion conversion element 111. In the embodiment of FIG. 2, the first linear to rotary motion conversion element 111 comprises an upward facing guiding surface in the form of helical ribs.

The skilled person will understand that, in the case where the first linear to rotary motion conversion element 111 comprises an upward facing guiding surface, it is advantageous when the second linear to rotary motion conversion element 211 comprises protrusions. Likewise, in the case where the first linear to rotary motion conversion element 111 comprises protrusions, it is advantageous when the second linear to rotary motion conversion element 211 comprises a downward facing guiding surface.

The helical ribs are arranged to display rotational symmetry around the longitudinal axis 101. Preferably, the helical ribs are composed of the same material as the first end cap 110 and manufactured together with the first end cap 110 during the same manufacturing process. Preferably, this material is a suitable plastic material. The manufacturing process can be any suitable process such as for instance injection molding.

Figure 8A:
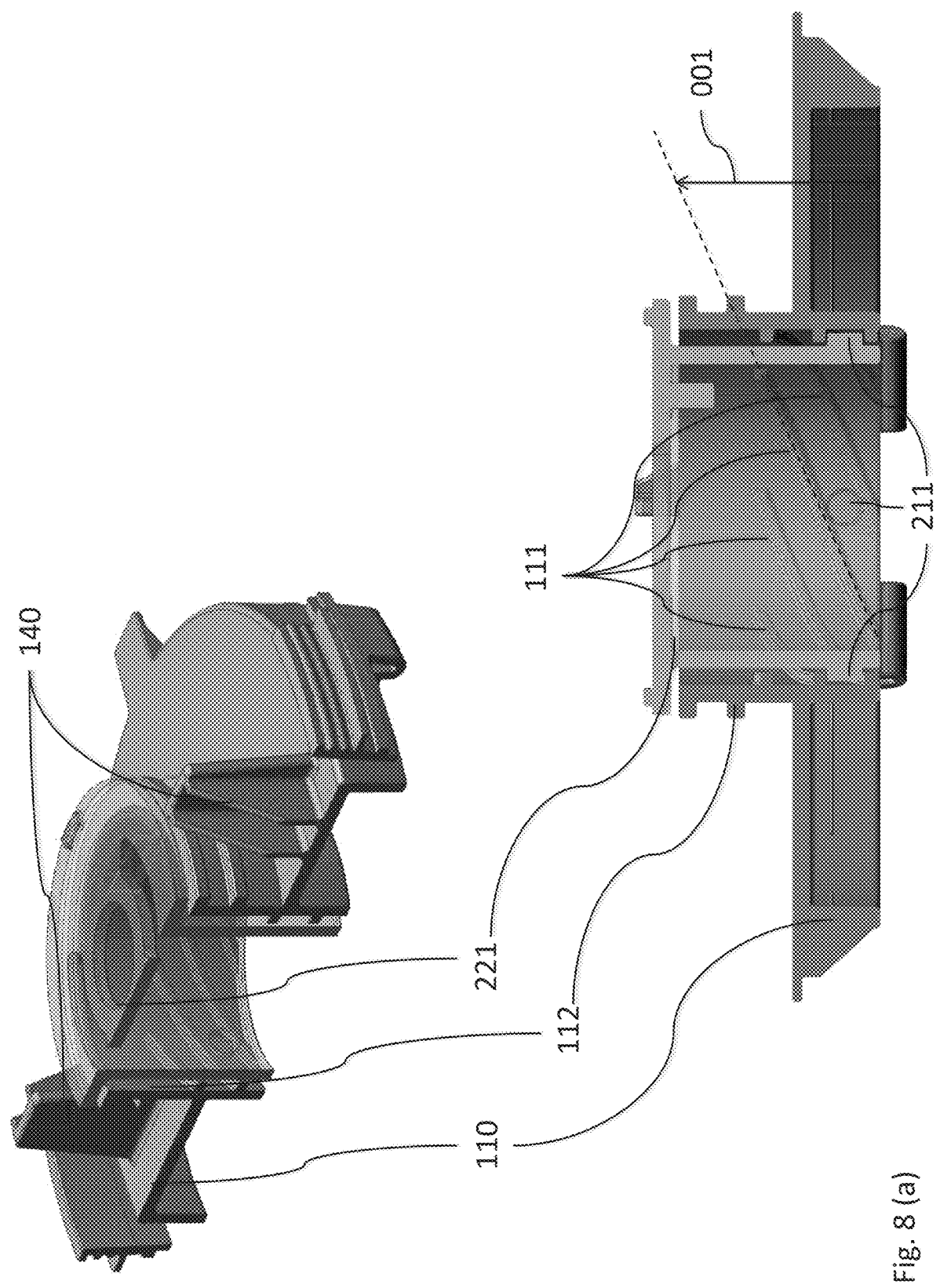
FIG. 8 (*a*)-(*g*) displays a perspective cross-section of possible embodiments of the first end cap of the filter element according to the present disclosure.
Figure 8:
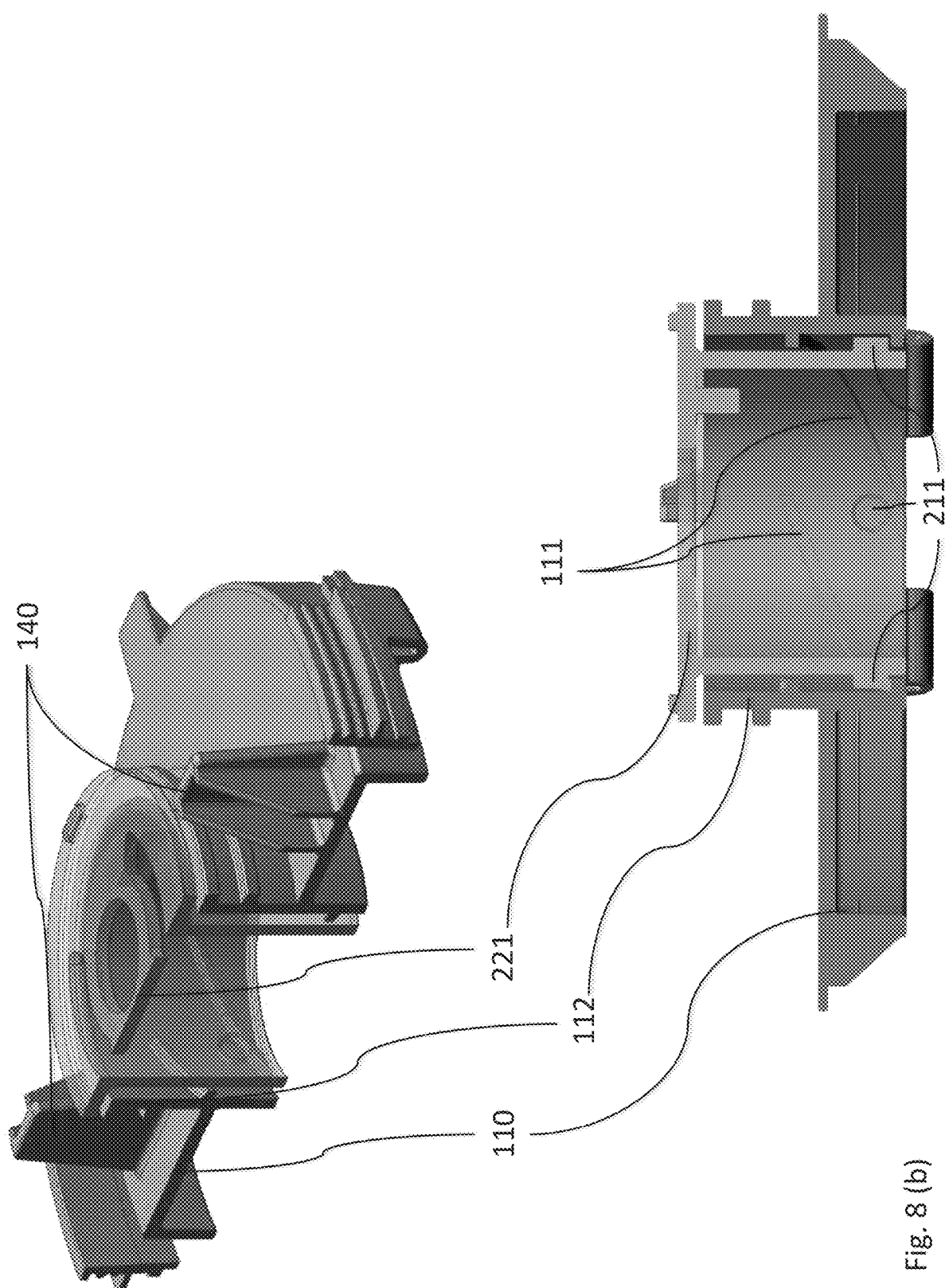
Figure 8:
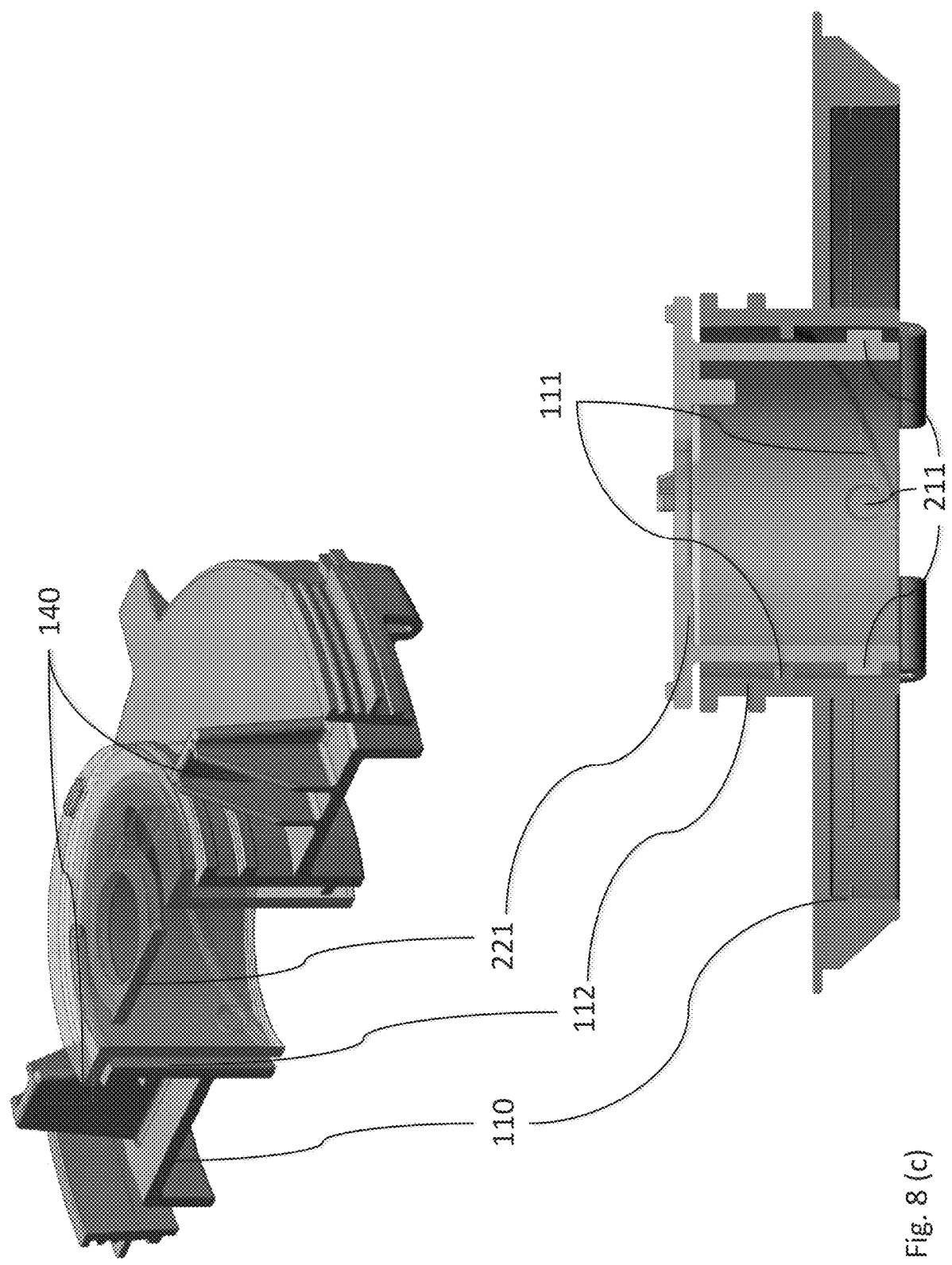
Figure 8:
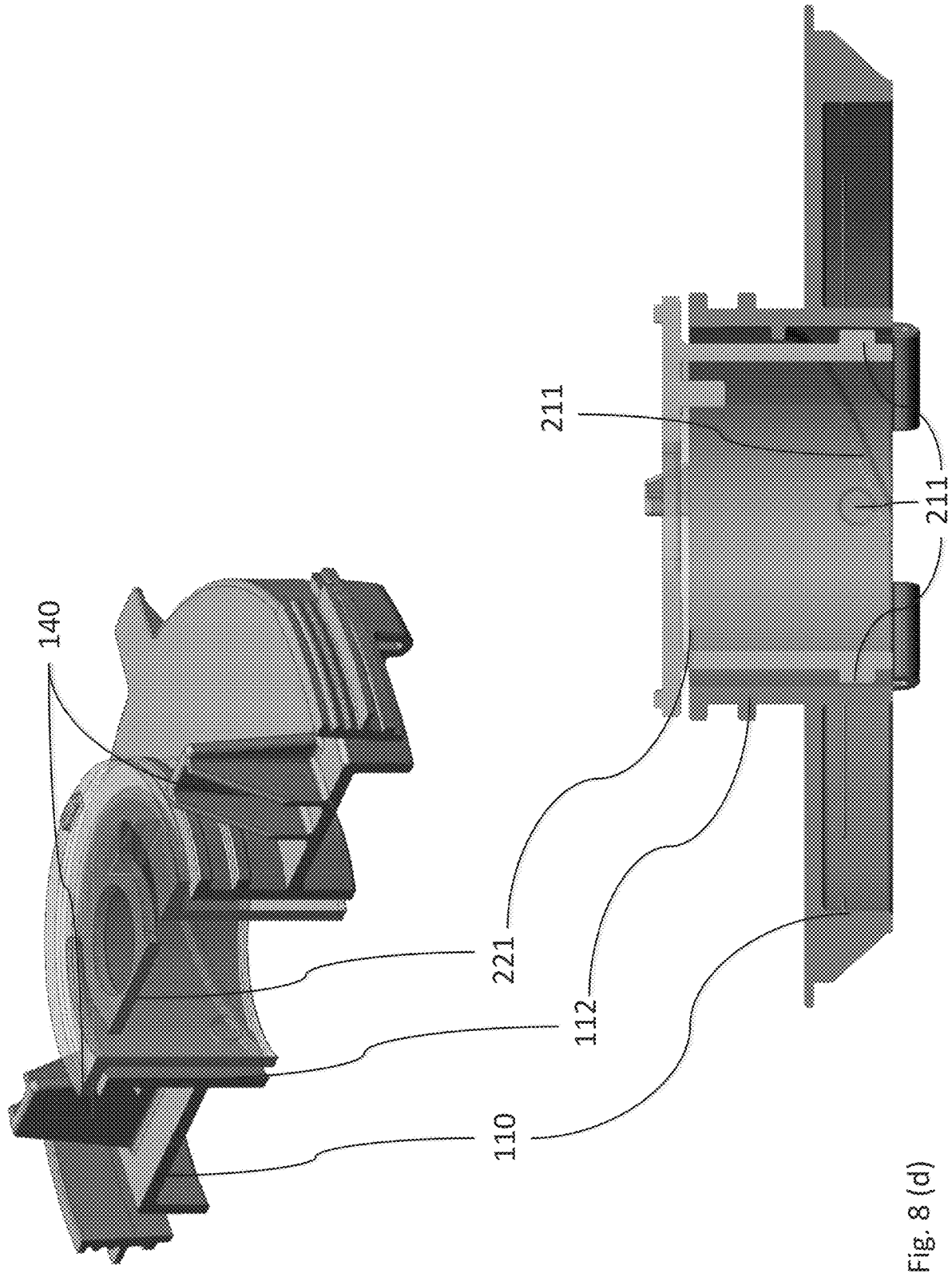
Figure 8:
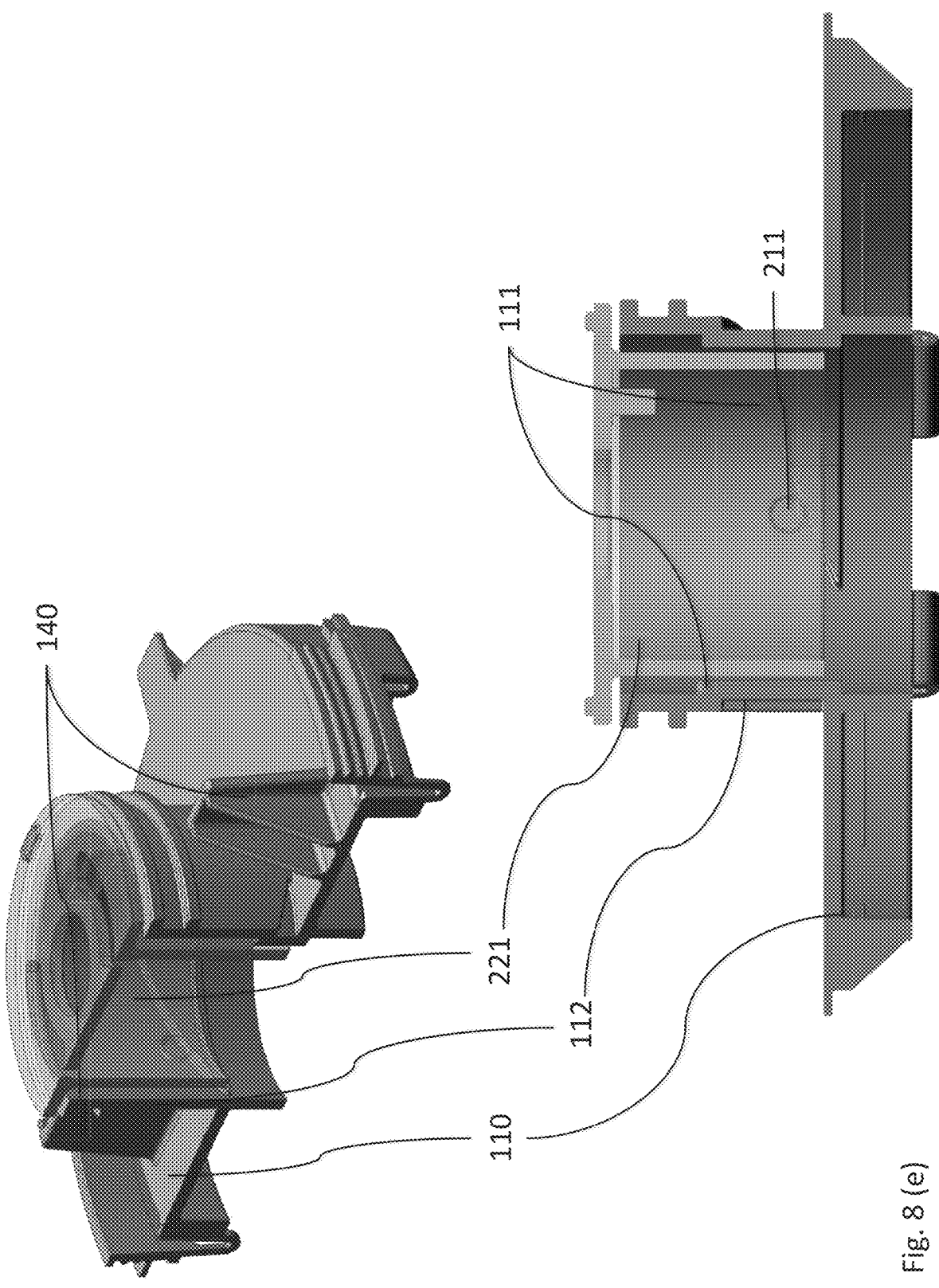
Figure 8:
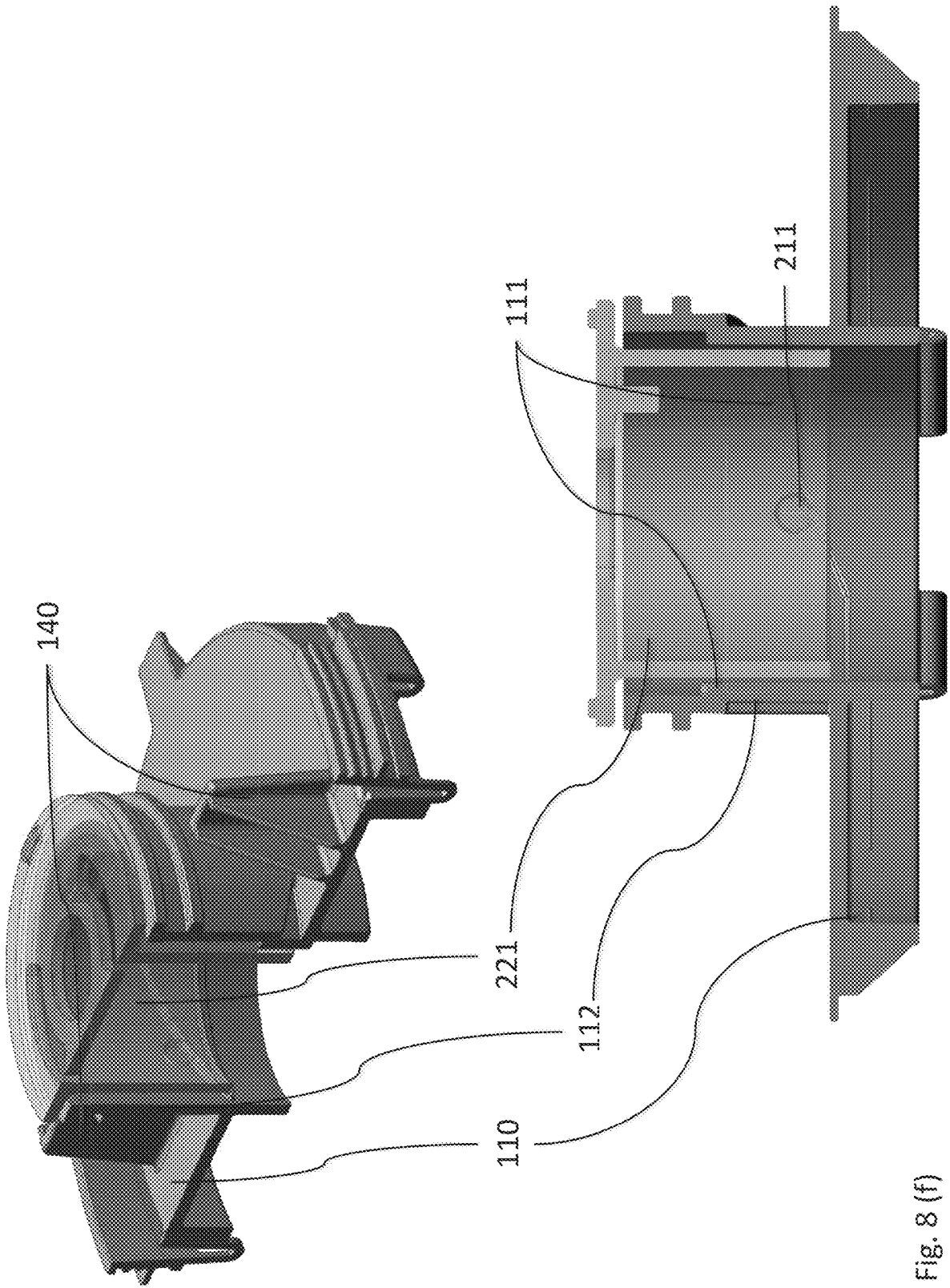
Figure 8:
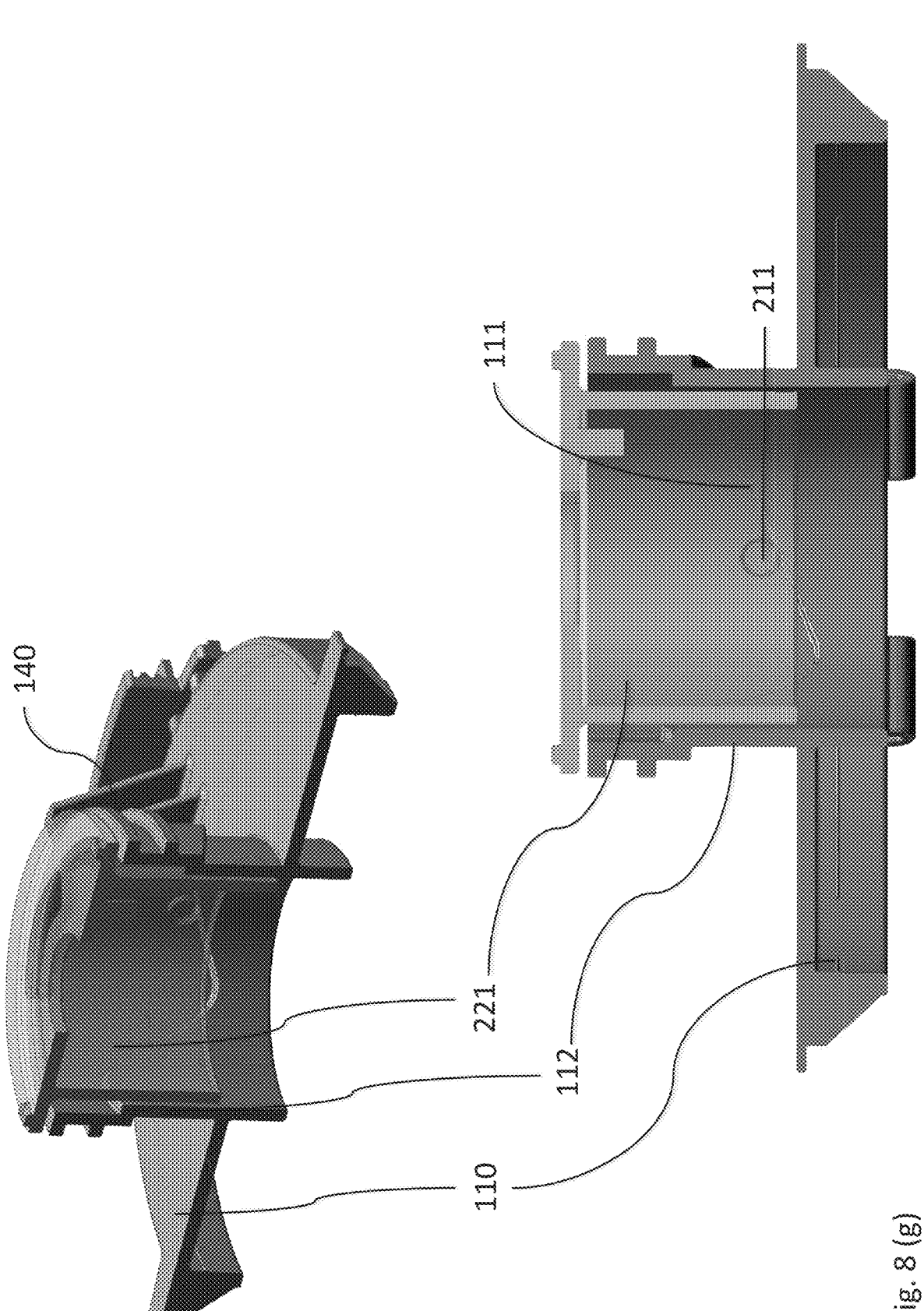

FIG. 8 (a)-(g) displays perspective cross-sections of various possible embodiments of the first linear to rotary motion conversion element 111 on the filter element 100 (not labeled in FIG. 8) and of the second linear to rotary motion conversion element 211 on the valve element 221 of the filter head 200 (not labeled in FIG. 8), according to the present disclosure.

In the embodiments displayed in FIG. 8 (a)-(g), the first end cap 110 comprises the first linear to rotary motion conversion element 111, the first linear to rotary motion conversion element 111 comprises an upward facing guiding surface and the second linear to rotary motion conversion element 211 comprises protrusions.

In FIG. 8 (a), the upward facing guiding surface comprises eight helical ribs. The eight helical ribs are arranged over the inside of the axially extending neck 112 to display eight-fold rotational symmetry around the longitudinal axis 101. Each of the helical ribs covers an angular extent of 90°. The helical ribs all have a constant and identical pitch angle 001.

The valve element 221 comprises four cylindrical protrusions on its outer radial surface. The four cylindrical protrusions are arranged over the surface to display four-fold rotational symmetry around the valve axle 226, which coincides with the longitudinal axis 101 when the filter head 200 (not depicted in FIG. 8 (a)-(g)) interacts with the filter element 100 (not labeled in FIG. 8 (a)-(g)).

The diameter of the protrusions is sufficiently small such that they fit between the helical ribs. It is an advantage of the embodiment of FIG. 8 (a) that the protrusions fit snugly between the ribs and that as a result, the upward facing guiding surface not only imparts a rotation upon the valve element 221 when the filter element approaches the valve element 221, but the upward facing guiding surface also imparts a rotation in the opposite direction upon the valve element 221 when the filter element moves away from the valve element 221, thereby assisting the torsion spring 225 (not labeled in FIG. 8 (a)-(g)) in closing the valve 220 (not labeled in FIG. 8).

In FIG. 8 (b), the upward facing guiding surface comprises four helical ribs. The four helical ribs are arranged over the inside of the axially extending neck 112 to display four-fold rotational symmetry around the longitudinal axis 101. Each of the helical ribs covers an angular extent of 90°. The helical ribs all have a constant and identical pitch angle 001. When compared to the embodiment of FIG. 8 (a), in the embodiment of FIG. 8 (b) the upward facing guiding surface does not assist in the closing of the valve 220 since the protrusions are not engaged by the upward facing guiding surface when the filter element 100 moves away from the valve element 221.

In FIG. 8 (c), the upward facing guiding surface comprises two helical ribs. The two helical ribs are arranged over the inside of the axially extending neck 112 to display two-fold rotational symmetry around the longitudinal axis 101. Each of the helical ribs covers an angular extent of 90°. The helical ribs all have a constant and identical pitch angle 001. When compared to the embodiment of FIG. 8 (a), in the embodiment of FIG. 8 (c) the upward facing guiding surface does not assist in the closing of the valve 220 since the protrusions are not engaged by the upward facing guiding surface when the filter element 100 moves away from the valve element 221.

In FIG. 8 (d), the upward facing guiding surface comprises one helical rib, covering an angular extent of 90°. The helical rib has a constant pitch angle 001. When compared to the embodiment of FIG. 8 (a), in the embodiment of FIG. 8 (d) the upward facing guiding surface does not assist in the closing of the valve 220 since the protrusions are not engaged by the upward facing guiding surface when the filter element 100 moves away from the valve element 221.

The embodiments of FIGS. 8 (e), (f) and (g) display various ways in which a variation in the inner diameter of the axially extending neck 112 can form two sloping ramps, creating an upward facing guiding surface on the inner radial surface of the axially extending neck 112. Each of the two sloping ramps covers an angular extent of at least 90°. Both sloping ramps have an identical pitch angle 001.

When compared to the embodiment of FIG. 8 (a), in the embodiments of FIGS. 8 (e), (f) and (g) the upward facing guiding surface does not assist in the closing of the valve 220 since the protrusions are not engaged by the upward facing guiding surface when the filter element 100 moves away from the valve element 221.

When compared to the embodiments of FIGS. 8 (a), (b), (c) and (d), it is an advantage of the embodiments of FIGS. 8 (e), (f) and (g) that variations in the inner diameter of the axially extending neck 112 can be easier to realize in manufacturing when compared to helical ribs on the inner radial surface of the axially extending neck 112.

Figure 3:
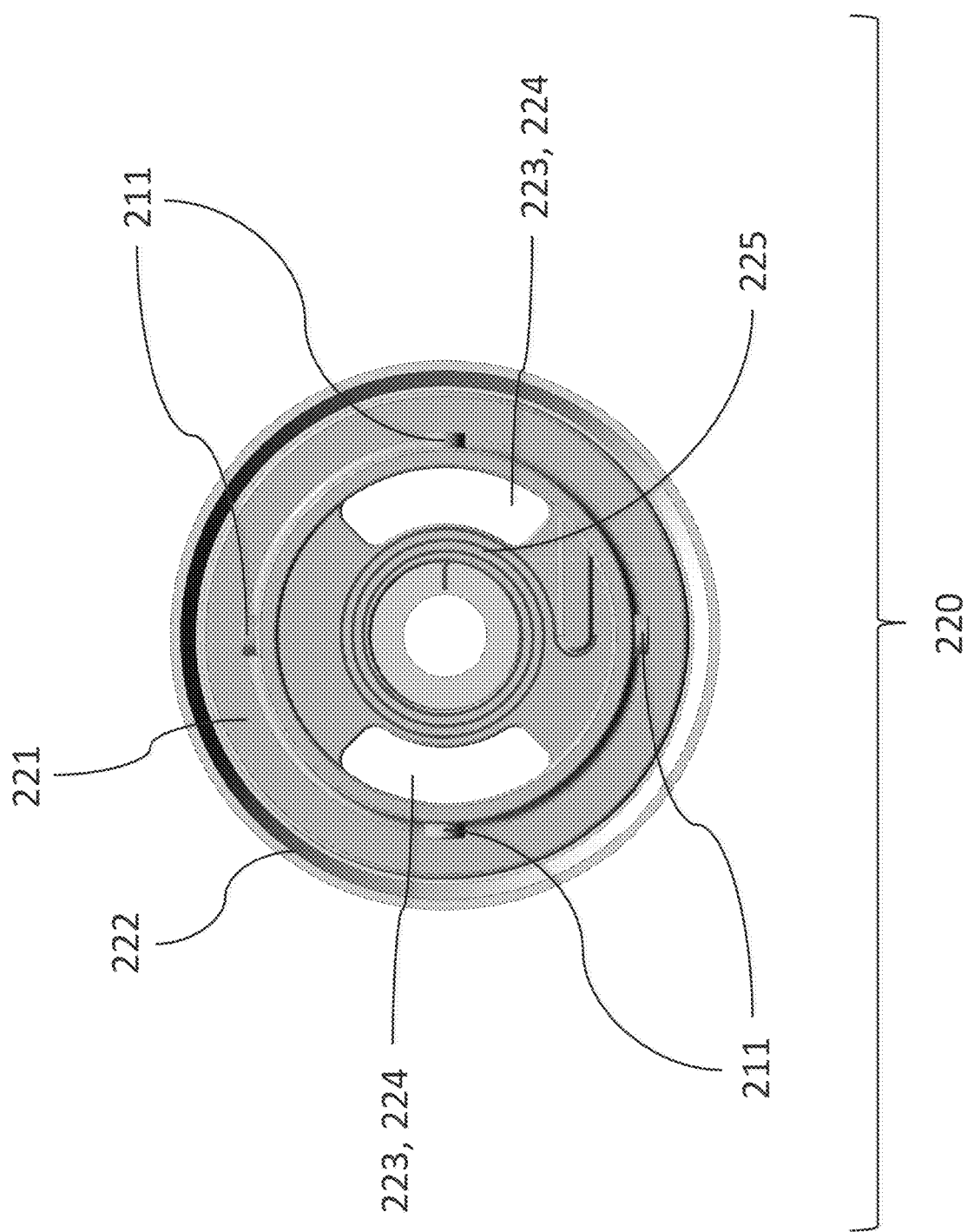
FIG. 3 displays a top view of an embodiment of a filter head valve according to the present disclosure.

FIG. 3 displays a top view of an embodiment of a filter head valve 220 according to the present disclosure. In the embodiment of FIG. 3, the valve 220 comprises two valve elements 221 and 222. The valve elements 221 and 222 comprise consecutive coaxial discs, arranged to rotate relative to each other around the valve axle 226 (not shown in FIG. 3). The valve element 221 comprises the second linear to rotary motion conversion element 211, embodied by radial protrusions, arranged to engage with the first linear to rotary motion conversion element 111, embodied by an upward facing guiding surface, on the first end cap 110 of a filter element 100 (not shown in FIG. 3). The rotation of valve element 221 around the valve axle 226 is biased by means of a torsion spring 225. The rotatable valve element 221 comprises axial openings 223 and the stationary valve element 222 comprises axial openings 224. Preferably, the openings 223 and 224 are similar or identical in number, shape and distribution over the surface of the valve elements. In the biased position of valve element 221, the openings 223 and 224 do not overlap. Preferably, the axial gap between the valve elements 221 and 222 is sufficiently small such that in the biased position, no fluid can flow through the valve 220 in axial direction.

Figure 4:
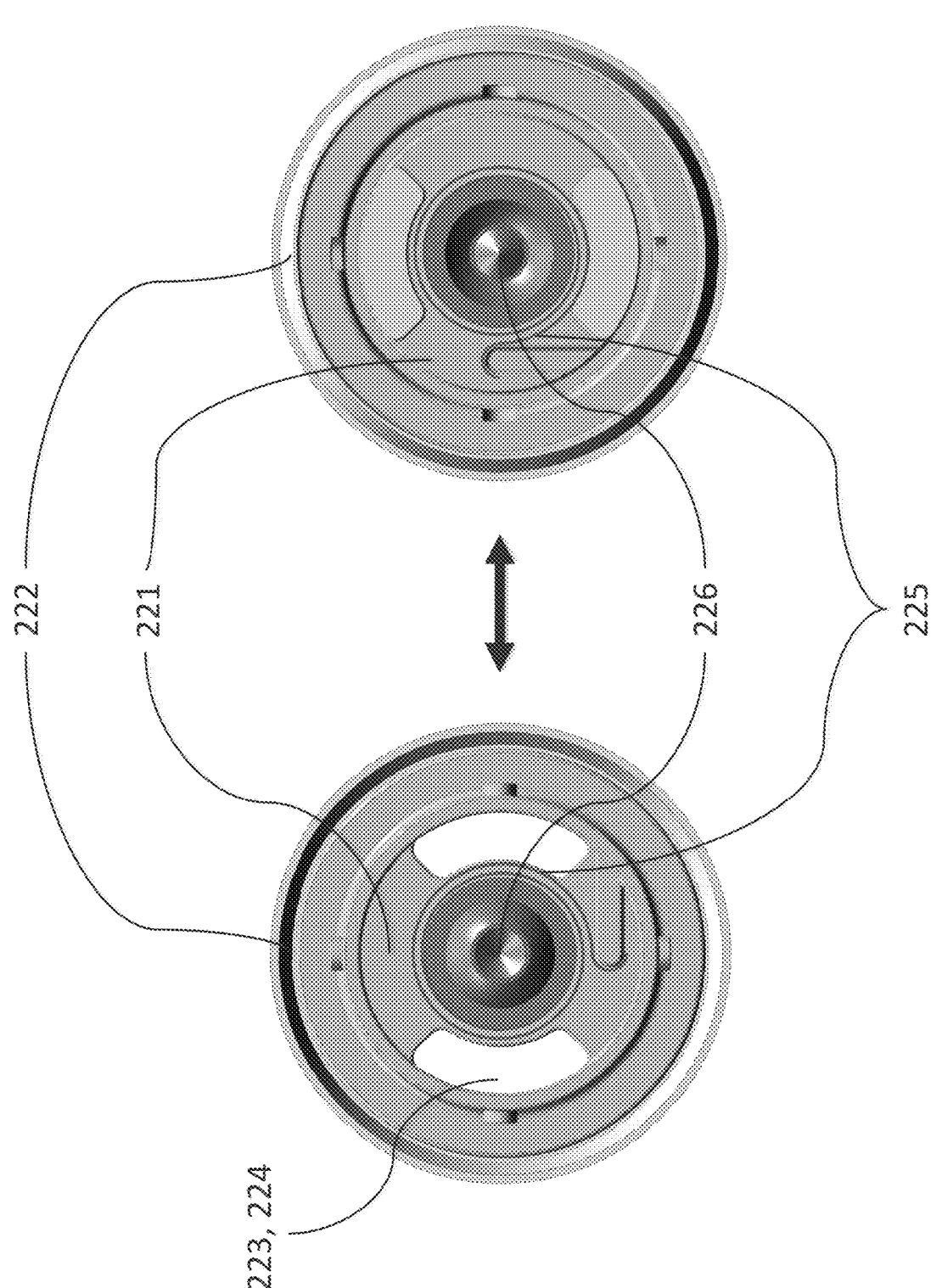
FIG. 4 displays a top view of an embodiment of a filter head valve according to the present disclosure in its opened and closed position.

FIG. 4 displays a top view of the embodiment of the filter head valve 220 according to FIG. 3 in its opened and closed position. In the biased position of valve element 221, the openings 223 and 224 do not overlap in axial direction and the valve 220 is closed. When the protrusions engage with the upward facing guiding surface on the first end cap 110 of a filter element 100 (not shown in FIG. 4), a torque is exerted on the valve element 221, opposite to the torque exerted by the torsion spring 225, and the valve element 221 rotates to its open position. In the open position of valve element 221, the openings 223 and 224 overlap in axial direction, the valve 220 is open and fluid can flow through the valve 220 in axial direction. Preferably, the relative rotation required from valve element 221 to transition the valve 220 from its opened to its closed state or vice versa is greater than 60°. Preferably, the relative rotation required from valve element 221 to transition the valve 220 from its opened to its closed state or vice versa is smaller than 120°. Preferably, the relative rotation required from valve element 221 to transition the valve 220 from its opened to its closed state or vice versa is equals 90°.

The skilled person will understand that the orientation of the upward facing guiding surface has to be chosen such that engagement of the guiding surface with the protrusions when the filter element 100 moves towards the filter head 200 causes the valve element 221 to rotate in a sense opposite to the sense imposed by the torsion spring 225. The skilled person understand that characteristics of the torsion spring 225 have to be chosen in a sensible way so as not to require excessive torque for the opening of valve 220.

Figure 5:
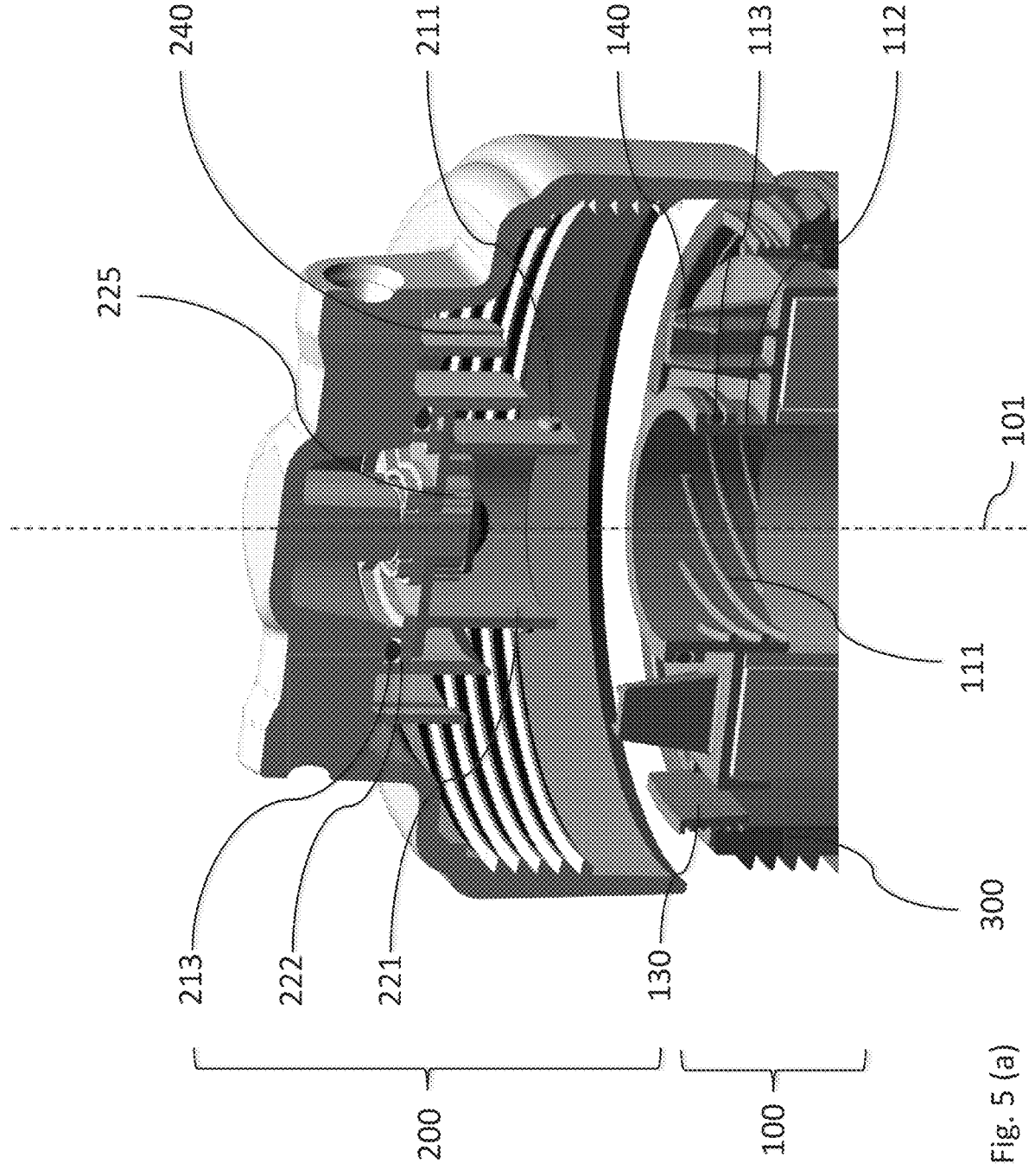
FIG. 5 (*a*)-(*d*) displays a perspective cross-section of the operation of the embodiment of a filtration assembly according to the present disclosure.
Figure 5:
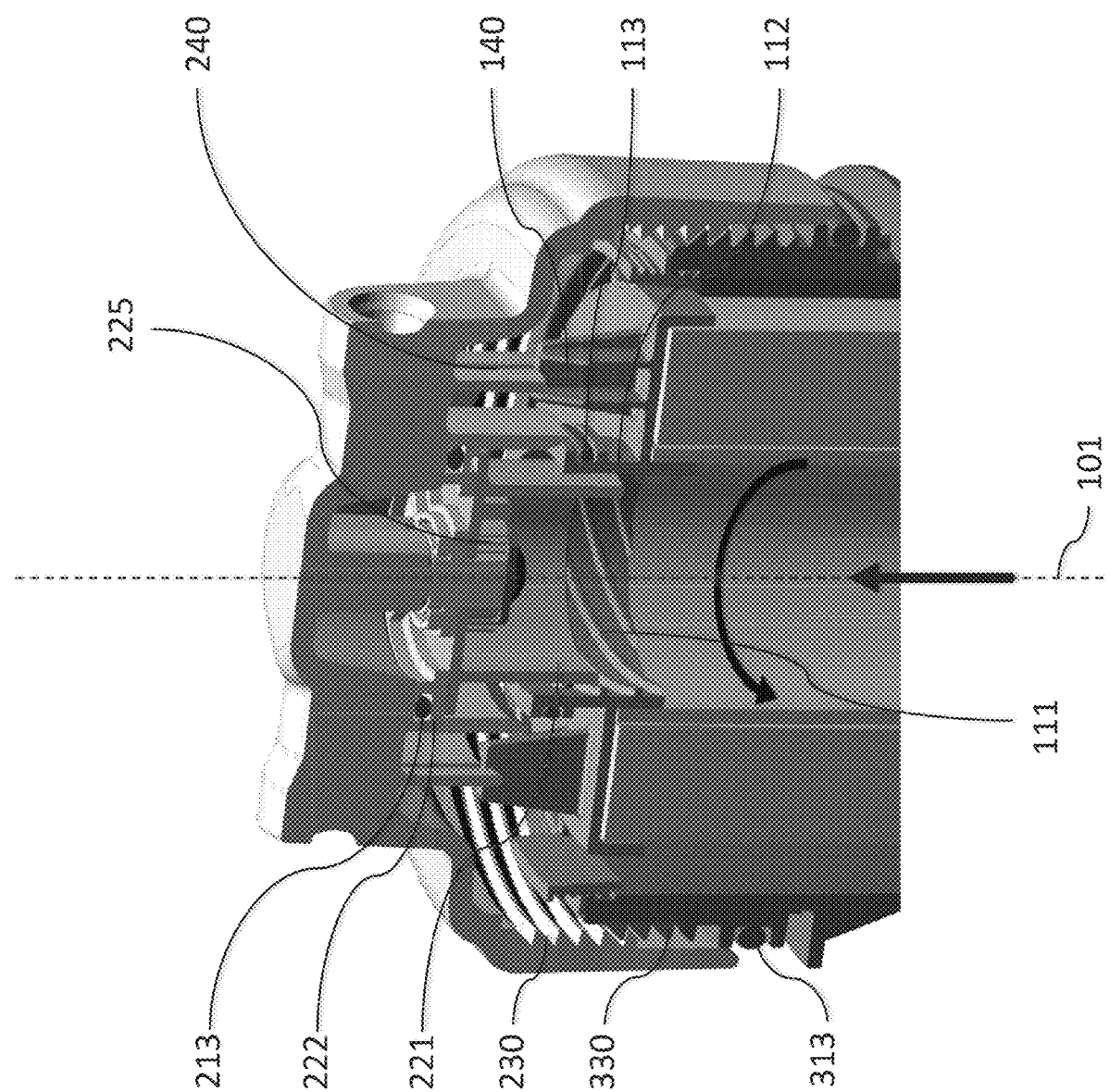
Figure 5:
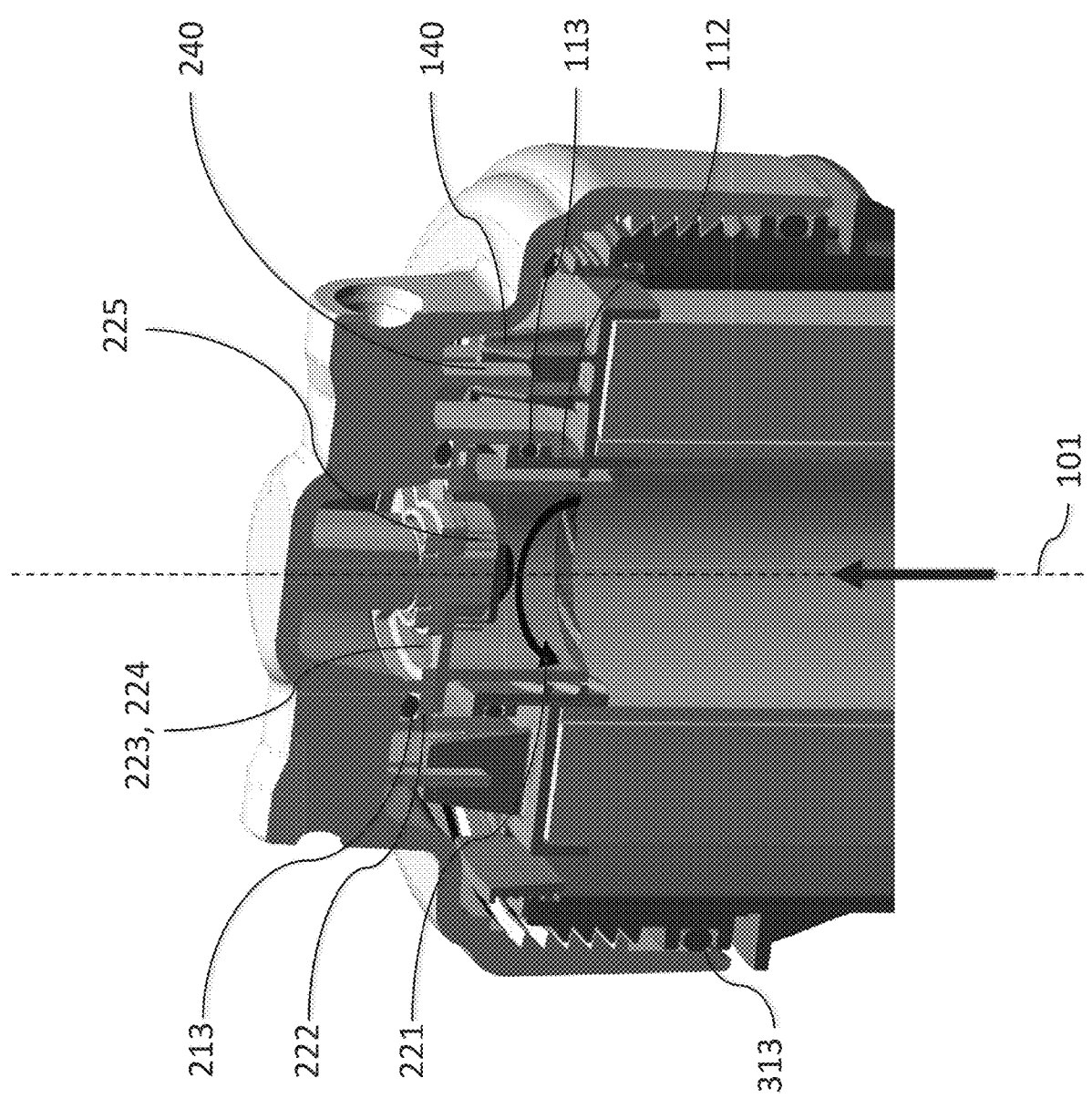
Figure 5:
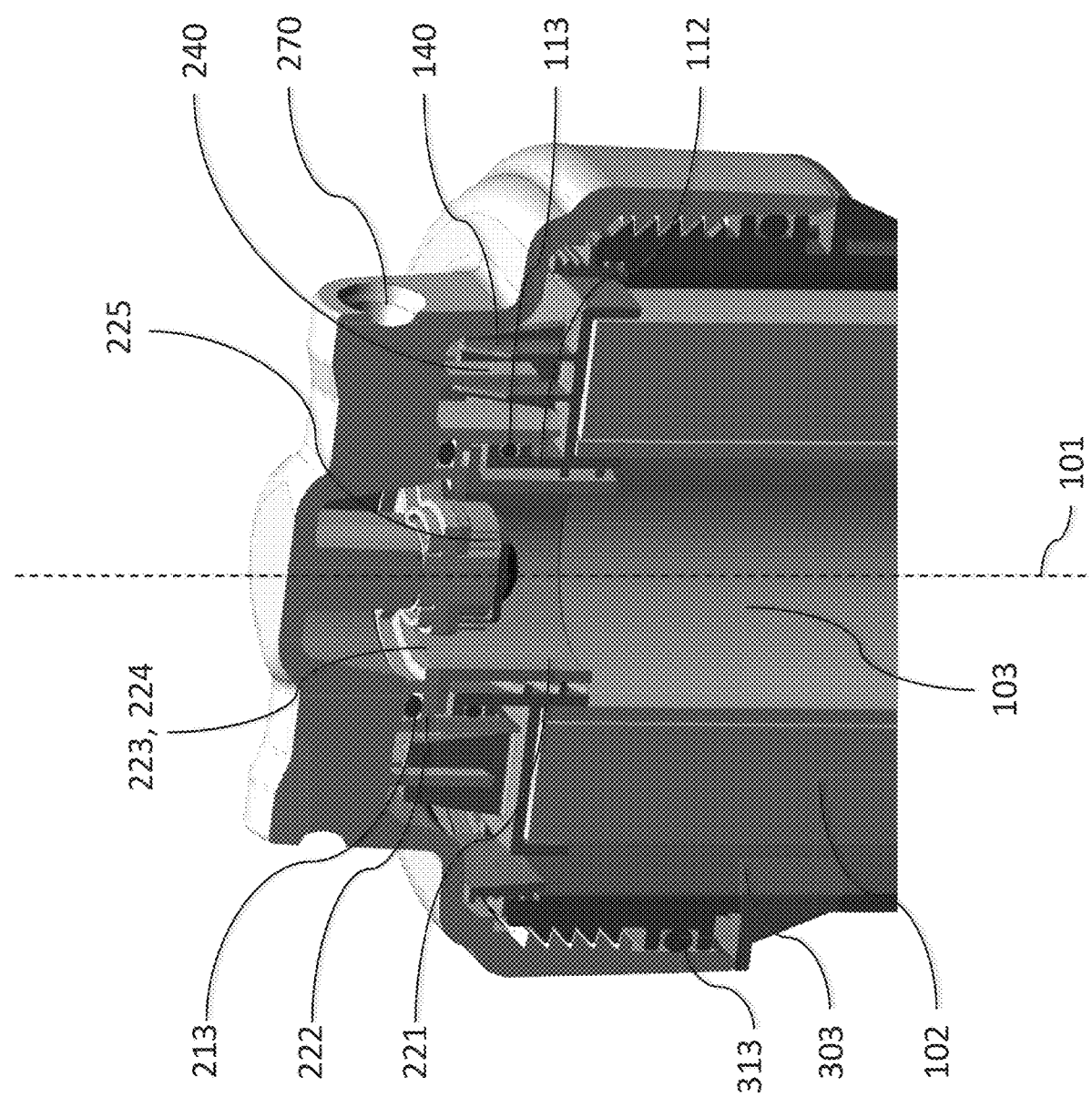

FIG. 5 (a)-(d) displays a perspective cross-section of the operation of an embodiment of a filtration assembly according to the present disclosure.

In FIG. 5 (a), the filter element 100 is received by the filter bowl 300 and secured by the snap fit connection 130 such that axial or radial movement between filter element 100 and filter bowl 300 is restricted while relative rotational movement between filter element 100 and filter bowl 300 is allowed.

In FIG. 5 (b), the filter bowl 300 comprising the filter element 100 is screwed onto the filter head 200, through engagement of the thread 330 on the outer radial surface of the filter bowl 300 with the thread 230 on the inner radial surface of the filter head 200. During the initial stage of this screwing process, the filter element 100 can rotate freely around the longitudinal axis 101 with respect to the filter bowl 300 and the filter head 200.

At a given axial distance between the first element 100 and the filter head 200, the stop 140 on the first end cap 110 of the filter element 100 abuts against the stop 240 on the filter head 200. In the embodiment of FIG. 5, both stops 140 and 240 comprise two stopping surfaces. Once the stop 140 on the first end cap 110 abuts against the stop 240 on the filter head 200, the relative movement of the filter element 100 with respect to the filter head 200 is restricted to a purely axial movement. Upon further screwing of the filter bowl 300 onto the filter head 200, the filter element 100 only moves axially with respect to the filter head 200 and rotationally with respect to the filter bowl 300.

FIG. 5 (c) depicts the phase of purely axial movement of the filter element 100 towards the filter head 200. During this phase, the second linear to rotary motion conversion element 211, embodied by radial protrusions, on the valve element 221 of the filter head 200 engage with the first linear to rotary motion conversion element 111, embodied by helical ribs of the upward facing guiding surface, of the filter element 100 such that the valve element 221 rotates around the valve axle 226 with respect to the valve element 222, the filter head 200 and the filter element 100. This rotational movement brings the openings 223 on the valve element 221 in line with the openings 224 on the valve element 222.

Preferably, the orientation of the upward facing guiding surface is chosen such that the rotation imposed upon the valve element 221 through the interaction of the guiding surface with the protrusions 211 has the opposite sense as the rotation imposed upon the valve element 221 by the bias means 225. The skilled person understands that the ease with which the described movement can be accomplished can depend amongst others on the number of helical ribs, the number of protrusions, the pitch angle 001 of the upward facing guiding surface, the respective materials out of which the upward facing guiding surface and the protrusions are made, the shape of the protrusions and the characteristics of the bias means 225.

Also during the phase of purely axial movement, the stationary valve element 222 engages the O-ring seal 113 on the axially extending neck 112. To allow this engagement, the radial distance between the innermost radial edge of the stops 140 and the outer radial surface of the axially extending neck 112 needs to be sufficiently large to accommodate the valve element 222. In the embodiment of FIG. 5 (a)-(d), the O-ring seal 113 is engaged only after the relative movement of the filter element 100 with respect to the filter head 200 is restricted to a purely axial movement by the engagement between the stops 140 and 240. This ensures that the angular orientation between the filter element 100 and the filter head 200 is determined by the configuration of the stops 140 and 240, and not by friction between the O-ring seal 113 and the valve element 222.

The diameters of the valve element 222, the axially extending neck 112 and the O-ring seal 113 are chosen such that no fluid can flow between the axially extending neck 112 and the valve element 222 once the O-ring seal 113 has been engaged.

Additionally, the filter head 200 engages the filter bowl O-ring seal 313 such that no fluid can flow out of the assembly between the filter head 200 and the filter bowl 300 once the O-ring seal 313 has been engaged. The valve O-ring seal 213 is positioned between the stationary valve element 222 and the body of the filter head 200 such that no fluid can flow between the stationary valve element 222 and the body of the filter head 200.

In FIG. 5 (d), the filter bowl 300 and the filter element 100 have reached their final position in the filter head 100. In this position, the valve element 221 is rotated such that the openings 223 are fully axially aligned with the openings 224. The valve 220 is thus maximally opened.

Fluid enters the flow annulus 303 between the filter bowl 300 and the filter media 102 through the filter inlet 260 (not shown in FIG. 5 (a)-(d)) in the filter head 200. The fluid flows through the filter media 102 into the open filter interior 103 and from the open filter interior 103 through the aligned openings 223 and 224 of the open valve 220 to the filter outlet 270 in the filter head 200.

When the filter bowl 300 is unscrewed from the filter head 200, the process described above is reversed. The valve element 221 rotates back to its biased position under the influence of the bias means 225 and/or the guiding surface, the valve 220 closes, the O-ring seal 113 is disengaged and the stops 140 and 240 disengage.

It is an advantage of the embodiment described above that the valve 220 will not open in the absence of a filter element 100. This protects the downstream application against the dangers of running without the presence of a filter element.

It is an additional advantage of the embodiment described above that the valve 220 will not open in the presence of a filter element 100 that is not compatible with the filter head 200. This protects the downstream application against the dangers of running without the presence of a suitable filter element.

Figure 6:
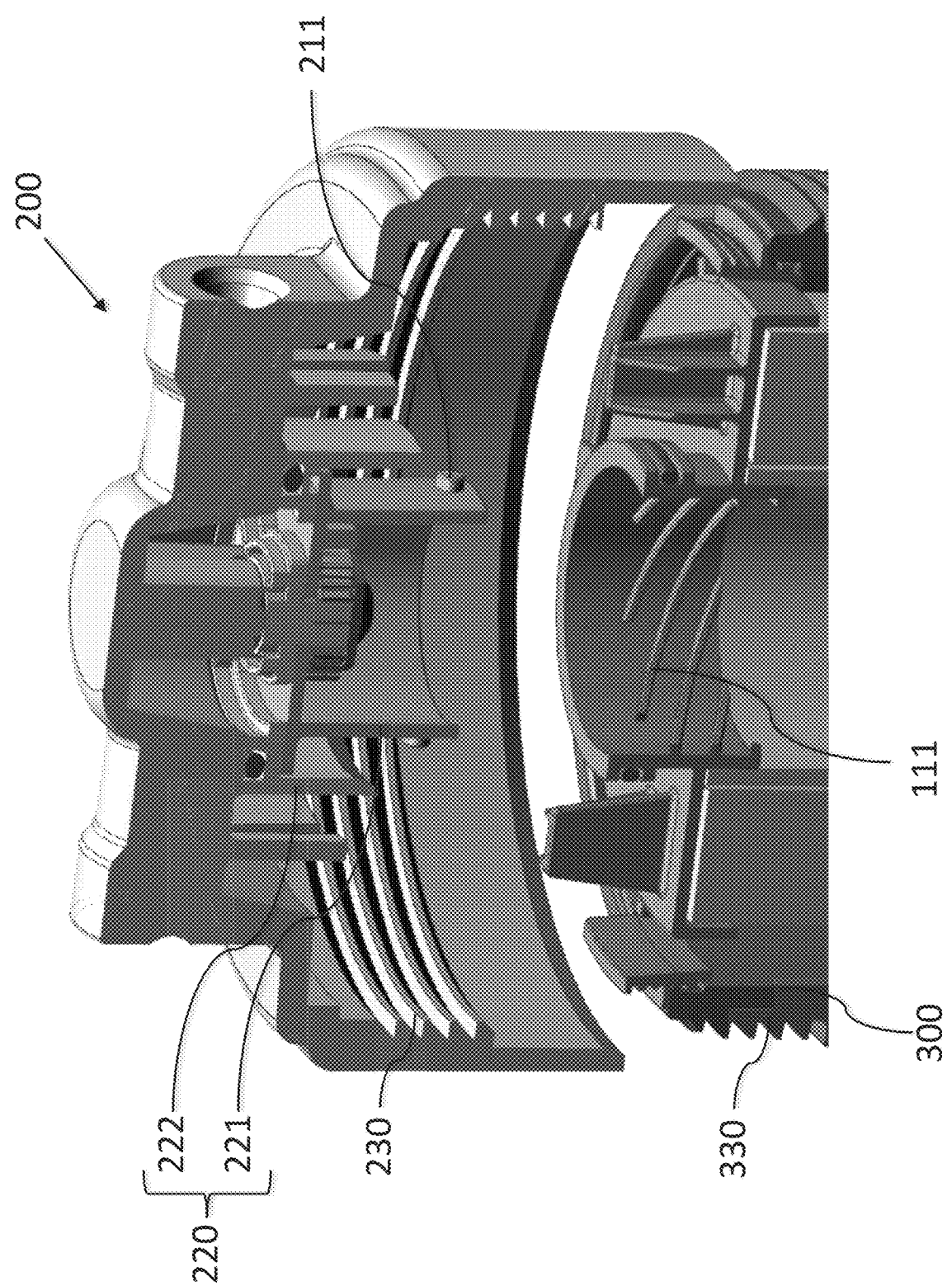
FIG. 6 displays a perspective cross-section of the embodiment of a filtration assembly according to the present disclosure.

FIG. 6 displays a perspective cross-section of the embodiment of a filtration assembly according to the present disclosure. The embodiment of the filtration assembly shown in FIG. 6 is substantially identical to the embodiment shown in FIG. 5 (a)-(d), except for the fact that the helical ribs composing the first linear to rotary motion conversion element 111 are oriented in the opposite sense. This gives the embodiment of FIG. 6 the advantage that the valve element 221 rotates in counter-clockwise direction with respect to the filter head 200 when the first linear to rotary motion conversion element 111 acts upon the first linear to rotary motion conversion element 211 to open the valve 220. This implies that, when using screw thread 230 and 330 of conventional orientation on respectively the filter head 200 and the filter bowl 300, the valve element 221 cannot be rotated to open the valve 220 by the friction between an incompatible filter element 100 and the valve element 221, but only by the interaction between compatible first and second linear to rotary motion conversion elements 111 and 211.

Figure 7:
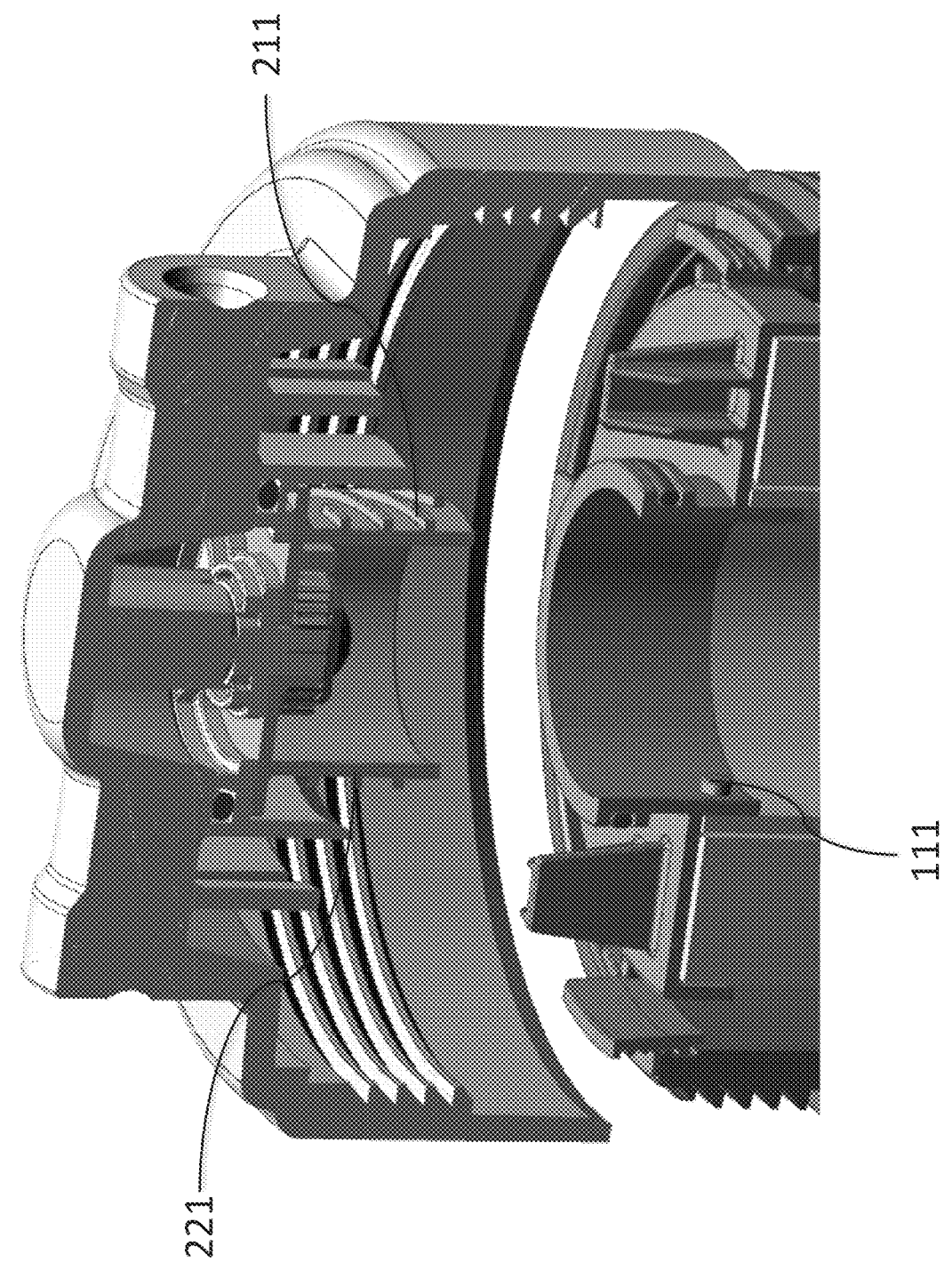
FIG. 7 displays a perspective cross-section of the embodiment of a filtration assembly according to the present disclosure.

FIG. 7 displays a perspective cross-section of the embodiment of a filtration assembly according to the present disclosure. The embodiment of the filtration assembly shown in FIG. 7 is substantially identical to the embodiment shown in FIG. 5 (a)-(d), except for the fact that the first linear to rotary motion conversion element 111 comprises protrusions and the second linear to rotary motion conversion element 211 comprises a downward facing guiding surface comprising helical ribs. Since protrusions are easier and cheaper to manufacture than a guiding surface, it might be advantageous to locate the protrusions on the filter element, which is a replacement part for the filtration system, and the guiding surface on the valve element 221, which is a durable part of the filtration system.

Figure 9:
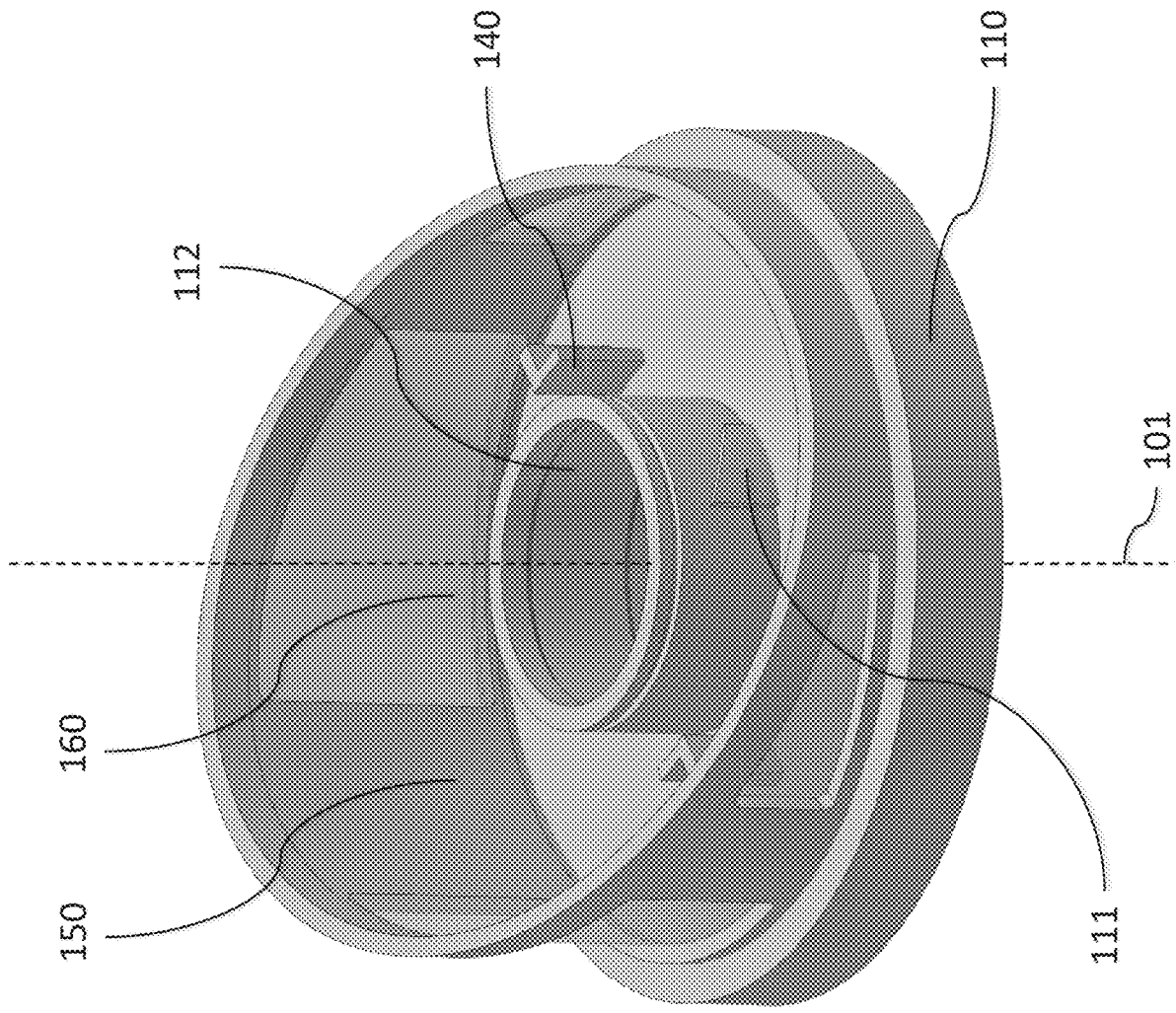
FIG. 9 displays a perspective view of an embodiment of a first end cap according to the present disclosure.

FIG. 9 displays a perspective view of an embodiment of a first end cap 110 according to the present disclosure, wherein the first linear to rotary motion conversion element 111 is formed by an upward facing guiding surface comprising one or more cylinder mantle sectors protruding from the first end cap 110 and arranged coaxially with the axially extending neck 112.

In the embodiment of FIG. 9, the first end cap 110 comprises an additional axially extending neck 150. The additional axially extending neck 150 is substantially cylindrical in shape, with the longitudinal axis 101 as cylinder axis, and extends in the direction away from the filter media 102 (not depicted in FIG. 9). The axially extending neck 112, the first linear to rotary motion conversion element 111 and the stops 140 fall within the inner perimeter of the additional axially extending neck 150 in axial projection. The additional axially extending neck 150 comprises a slanted top. The axially extending neck 112, the first linear to rotary motion conversion element 111 and the stops 140 do not extend past the slanted top of the additional axially extending neck 150. The additional axially extending neck 150 comprises sections composed of a mesh material 160 in its radial surface.

Figure 10:
FIG. 10 displays a cross-section of a filtration assembly according to the present disclosure.

FIG. 10 displays a cross-section of a filtration assembly according to the present disclosure, comprising an embodiment of a first end cap 110 as described in FIG. 9. In this embodiment, the valve 220 comprises two valve elements 221 and 222. The valve elements 221 and 222 comprise two coaxial cylindrical elements arranged to rotate relative to each other around the valve axle 226 (not shown in FIG. 10). The valve element 221 comprises a second linear to rotary motion conversion element 211 embodied as axial protrusions (not shown in FIG. 10), arranged to engage with the upward facing guiding surface comprising inner cylinder mantle sectors of the first linear to rotary motion conversion element 111 on the first end cap 110 of the filter element. The rotation of valve element 221 around the valve axle 226 is biased by means of a bias means 225, such as for instance a torsion spring (not shown in FIG. 10). The valve element 221 comprises a radial opening 223 and the valve element 222 comprises a radial opening 224. Preferably, the openings 223 and 224 are similar or identical in shape and distribution over the surface of the valve elements.

In the biased position of valve element 221, the openings 223 and 224 do not overlap. Preferably, the radial gap between the valve elements 221 and 222 is sufficiently small such that in the biased position, no fluid can flow through the valve 220. When the second linear to rotary motion conversion element 211 engages with the first linear to rotary motion conversion element 111 on the first end cap 110, a torque is exerted on the valve element 221, opposite to the torque exerted by the bias means 225, and the valve element 221 rotates to its open position. In the open position of valve element 221, the openings 223 and 224 overlap in radial direction, the valve 220 is open and fluid can flow into the valve 220 in axial direction from the bottom and out of the valve in radial direction through the overlapping openings 223 and 224. Preferably, the relative rotation required for valve element 221 to transition the valve 220 from its opened to its closed state or vice versa is greater than 60°. Preferably, the relative rotation required from valve element 221 to transition the valve 220 from its opened to its closed state or vice versa is smaller than 120°. Preferably, the relative rotation required from valve element 221 to transition the valve 220 from its opened to its closed state or vice versa equals 90°.

The skilled person will understand that the orientation of the upward facing guiding surface has to be chosen such that engagement of the guiding surface with the protrusions when the filter element 100 moves towards the filter head 200 causes the valve element 221 to rotate in a sense opposite to the sense imposed by the torsion spring 225. The skilled person understand that the characteristics of the bias means 225 have to be chosen in a sensible way so as not to require excessive torque for the opening of valve 220.

In the embodiment of FIG. 10, the valve element 222, which remains stationary at all times with respect to the filter head 200, comprises a slanted surface which matches the slant of additional axially extending neck 150 with a slanted top on the first end cap 110. The stops 140 and 240 (not shown in FIG. 10) are configured such that, upon assembly of the filtration system, the first end cap 110 is rotationally locked with respect to valve element 222 in the position where both slanted surfaces are perfectly aligned. As a result, once the filter element 100 and the filter bowl 300 have reached their final assembled position in the filter head 200, an additional volume 290 is created, enclosed by the first end cap 110, the additional axially extending neck 150 and the valve element 222.

It is an advantage of this embodiment that this additional volume 290 can be equipped with a bypass valve 280. If there is a need for the fluid to bypass the filter media 102 (not depicted in FIG. 9), the bypass valve 280 can be opened such that the fluid can flow from the inlet 260, through the mesh 160 and the bypass valve 280, to the outlet 270. This can be useful when the pressure on the inlet side 260 exceeds a predetermined threshold value, for instance due to clogging of the filter media 102.

The invention claimed is:

1. A filter element for releasable connection with a filter head, said filter element having an elongate shape with a longitudinal axis; the filter element comprising:
    (a) a first end cap defining a first open aperture;
    (b) a tubular construction of filter media defining an open filter interior and having first and second opposite ends, the first end being secured to the first end cap whereby the first open aperture is in communication with the open filter interior; and (c) an axially extending neck, surrounding said first open aperture, having an outer radial surface and an inner radial surface;

wherein said filter element comprises a first linear to rotary motion conversion element, arranged to engage with a second linear to rotary motion conversion element on a valve element of said filter head so as to impart, when said filter element is moved linearly towards said valve element in a direction along said longitudinal axis, a rotational movement onto said valve element; the first linear to rotary motion conversion element comprising a plurality of helical ribs.

2. The filter element according to claim 1, wherein said first linear to rotary motion conversion element is in a fixed position relative to said filter element.

3. The filter element according to claim 1, wherein said axially extending neck comprises said first linear to rotary motion conversion element.

4. The filter element according to claim 3, wherein said first linear to rotary motion conversion element is adjacent to said inner radial surface of said axially extending neck.

5. The filter element according to claim 1, wherein each rib in the plurality of helical ribs comprises an upward facing guiding surface following an axially progressing path.

6. The filter element according to claim 1, wherein each of the helical ribs covers an angular extent of 90°.

7. The filter element according to claim 5, wherein the plurality of helical ribs are on said inner radial surface.

8. The filter element according to claim 1, wherein said first end cap further comprises one or more axially protruding and radially extending stops, arranged to rest against one or more corresponding stops of the filter head to inhibit rotation of said filter element relative to said filter head.

9. The filter element according to claim 8, wherein said one or more stops are configured to inhibit rotation of said filter element relative to said filter head in both clockwise and counter-clockwise direction around said longitudinal axis.

10. The filter element according to claim 8, wherein the radial distance between an innermost radial edge of said one or more stops and said outer radial surface of said axially extending neck is equal to or larger than 5 mm.

11. The filter element according to claim 1, wherein said outer radial surface of said axially extending neck comprises an O-ring seal.

12. The filter element according to claim 11, wherein the axial height of said one or more stops with respect to a main outer surface of said first end cap is superior to the axial distance between said O-ring seal and said main outer surface of said first end cap.

* * * * *